United States Patent
Shields et al.

(10) Patent No.: US 11,838,692 B2
(45) Date of Patent: Dec. 5, 2023

(54) SYSTEMS AND METHODS FOR LOCAL DIMMING IN MULTI-MODULATION DISPLAYS

(71) Applicant: Dolby Laboratories Licensing Corporation, San Francisco, CA (US)

(72) Inventors: Jerome Shields, Lumberton, NJ (US); Martin J. Richards, Gig Harbor, WA (US); Juan P. Pertierra, Fishers, IN (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/168,289

(22) Filed: Feb. 13, 2023

(65) Prior Publication Data

US 2023/0188686 A1   Jun. 15, 2023

Related U.S. Application Data

(63) Continuation of application No. 16/910,044, filed on Jun. 23, 2020, now Pat. No. 11,582,432, which is a
(Continued)

(51) Int. Cl.
*G02B 27/48* (2006.01)
*H01S 5/42* (2006.01)
(Continued)

(52) U.S. Cl.
CPC ......... *H04N 9/3126* (2013.01); *B65B 11/045* (2013.01); *B65B 11/48* (2013.01); *B65B 11/58* (2013.01); *B65B 49/08* (2013.01); *B65B 51/06* (2013.01); *B65B 55/00* (2013.01); *B65B 61/06* (2013.01); *B65B 61/26* (2013.01); *G03B 21/005* (2013.01); *G03B 21/13* (2013.01); *G03B 21/208* (2013.01); *H04N 9/3123* (2013.01); *H04N 9/3155* (2013.01); *H04N 9/3164* (2013.01); *B65B 2220/16* (2013.01)

(58) Field of Classification Search
USPC ....................................................... 359/601
See application file for complete search history.

(56) References Cited

U.S. PATENT DOCUMENTS

| 7,551,341 B1* | 6/2009 | Ward | G03B 21/005 |
| | | | 359/259 |
| 2006/0087712 A1* | 4/2006 | Harper | G09G 3/34 |
| | | | 348/E5.142 |

(Continued)

*Primary Examiner* — Jerry L Brooks

(57) ABSTRACT

Dual and multi-modulator projector display systems and techniques are disclosed. In one embodiment, a projector display system comprises a light source; a controller, a first modulator, receiving light from the light source and rendering a halftone image of said the input image; a blurring optical system that blurs said halftone image with a Point Spread Function (PSF); and a second modulator receiving the blurred halftone image and rendering a pulse width modulated image which may be projected to form the desired screen image. Systems and techniques for forming a binary halftone image from input image, correcting for misalignment between the first and second modulators and calibrating the projector system—e.g. over time—for continuous image improvement are also disclosed.

13 Claims, 15 Drawing Sheets

Related U.S. Application Data continuation of application No. 15/995,017, filed on May 31, 2018, now Pat. No. 10,694,157, which is a continuation of application No. 15/034,169, filed as application No. PCT/US2014/062952 on Oct. 29, 2014, now Pat. No. 9,992,460.

(60) Provisional application No. 61/899,280, filed on Nov. 3, 2013.

(51) Int. Cl.
| | | |
|---|---|---|
| *H04N 9/31* | (2006.01) | |
| *G03B 21/20* | (2006.01) | |
| *G03B 21/00* | (2006.01) | |
| *B65B 11/04* | (2006.01) | |
| *B65B 11/48* | (2006.01) | |
| *B65B 11/58* | (2006.01) | |
| *B65B 49/08* | (2006.01) | |
| *B65B 51/06* | (2006.01) | |
| *B65B 55/00* | (2006.01) | |
| *B65B 61/06* | (2006.01) | |
| *B65B 61/26* | (2006.01) | |
| *G03B 21/13* | (2006.01) | |

(56) References Cited

U.S. PATENT DOCUMENTS

2007/0024811 A1* 2/2007 Piehl .................... G03B 33/08
                                                          353/30
2008/0158245 A1* 7/2008 Lieb .................... G03B 21/005
                                                          345/589

* cited by examiner

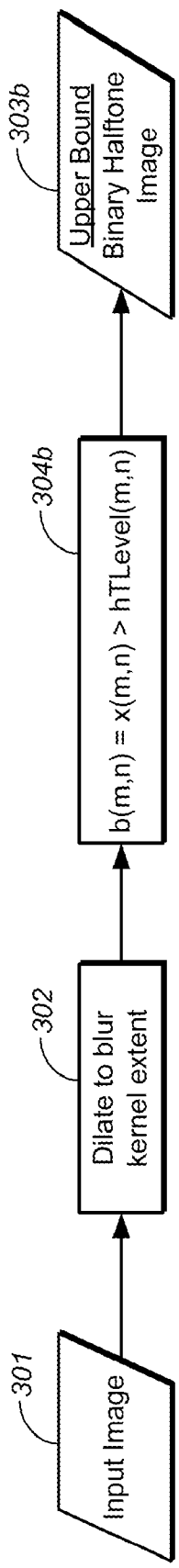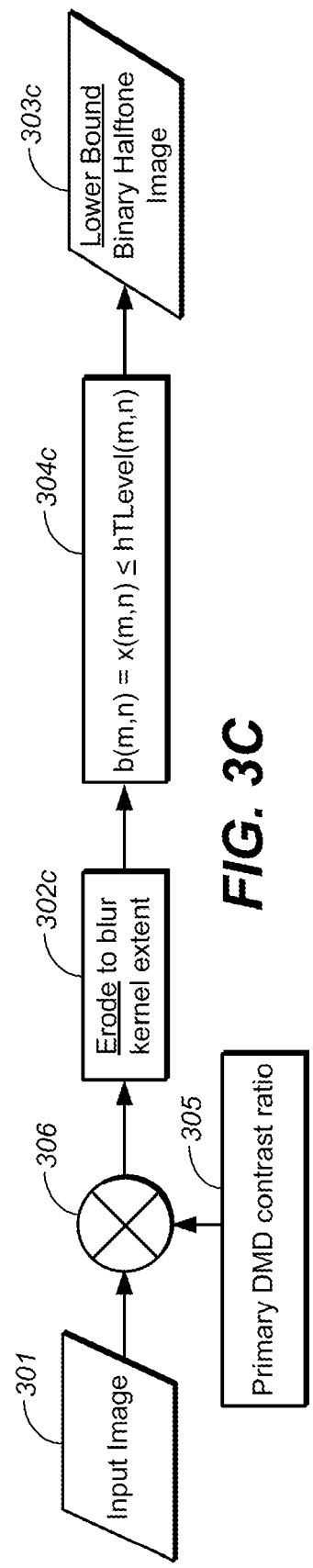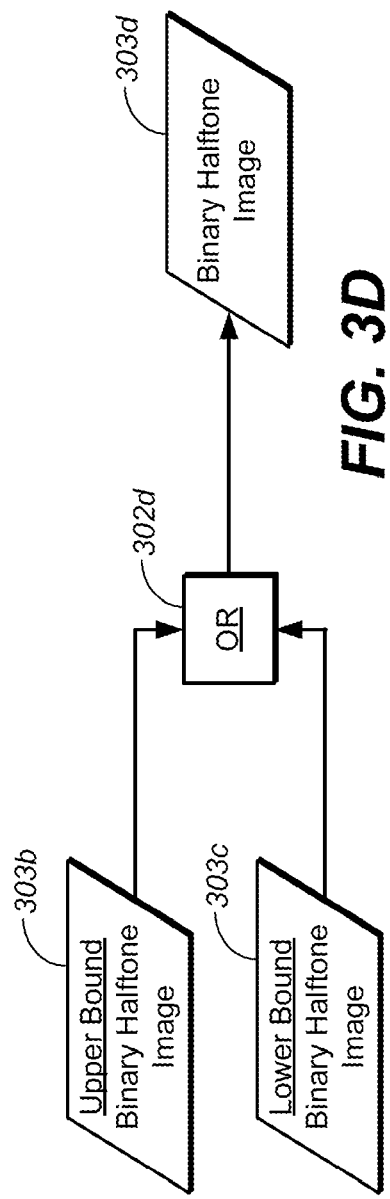
FIG. 3B
FIG. 3C
FIG. 3D

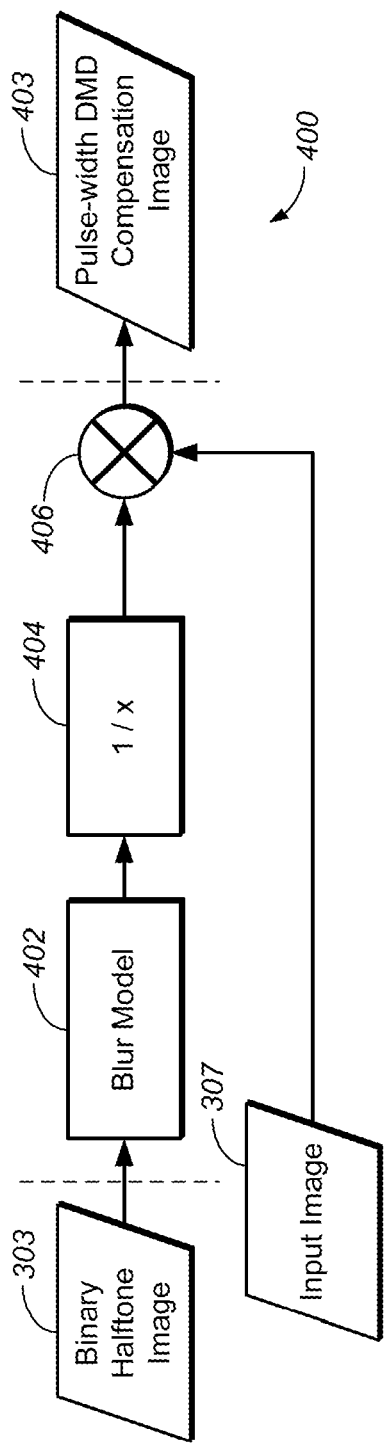
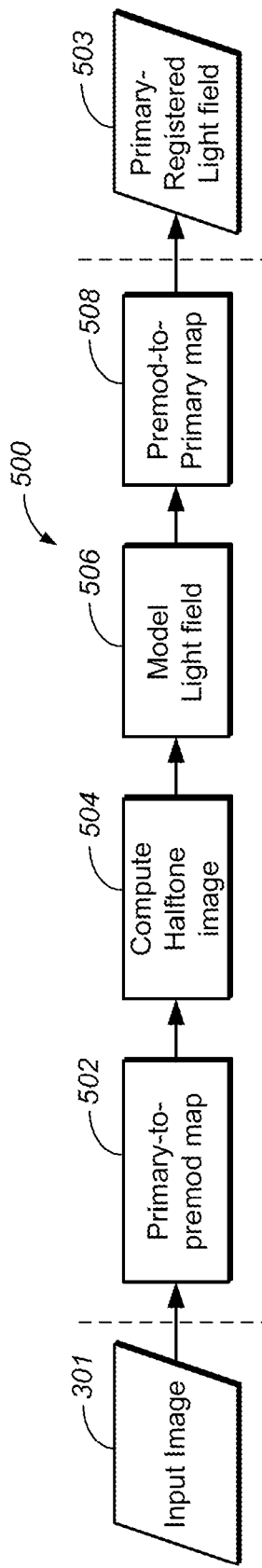
FIG. 4
FIG. 5

SYSTEMS AND METHODS FOR LOCAL DIMMING IN MULTI-MODULATION DISPLAYS

CROSS-REFERENCE TO RELATED APPLICATIONS

This application is a continuation application of U.S. patent application Ser. No. 16/910,044 filed on Jun. 23, 2020, which is a continuations of U.S. patent application Ser. No. 15/995,017 filed on May 31, 2018, now U.S. Pat. No. 10,694,157 issued on Jun. 23, 2020, which is a continuation of U.S. patent application Ser. No. 15/034,169 filed on May 3, 2016, now U.S. Pat. No. 9,992,460 issued on Jun. 5, 2018, which is the U.S. National Stage of International Application No. PCT/US2014/062952 filed Oct. 29, 2014, which claims the benefit of priority from U.S. Provisional Patent Application No. 61/899,280 filed Nov. 3, 2013, all of which are incorporated herein by reference.

TECHNICAL FIELD

The present invention relates to multi-modulation display systems and, particularly, to systems and methods for rendering image and video data on multi-modulation display systems.

BACKGROUND

Projector systems are now being architected with improvements in dynamic range and light efficient use. Dual and multi-modulator projector display systems are known in the art. However, additional improvements are possible in both the rendering and the performance of such display systems resulting from improved modeling of the light processing in such display systems.

SUMMARY

Dual and multi-modulator projector display systems and techniques are disclosed. In one embodiment, a projector display system comprises a light source; a controller, a first modulator, receiving light from the light source and rendering a halftone image of the input image; a blurring optical system that blurs said halftone image with a Point Spread Function (PSF); and a second modulator receiving the blurred halftone image and rendering a pulse width modulated image which may be projected to form the desired screen image. Systems and techniques for forming a binary halftone image from input image, correcting for misalignment between the first and second modulators and calibrating the projector system—e.g. over time—for continuous image improvement are also disclosed In one embodiment, a projector display system, comprising: a laser light source; a controller, said controller receiving input image data and outputting control signals; a first modulator, said first modulator receiving light from said laser light source, said first modulator receiving said control signals from said controller such that said first modulator is capable of rendering a halftone image of said input image; a blurring optical system; said blurring optical system blurring said halftone image received from said first modulator; and a second modulator, said second modulator receiving said blurred halftone image from said blurring optical system and receiving said control signals from said controller such that said second modulator is capable of rendering a pulse width modulated image, said pulse width modulator image capable of being projected to form the desired screen image.

In another embodiment, a method for projecting desired screen images from input image data in a projector display system, said projector display system comprising a light source, a controller, said controller receiving input image data and outputting control signals, a premod modulator receiving control signals from said controller and light from said light source, a blurring optical system receiving light from said premod modulator, and a primary modulator receiving control signals from said controller and light from said blurring optical system, the method comprising: creating a binary halftone image from said input image data; creating a blurred binary halftone image from said binary halftone image; creating a pulse width modulated image from said blurred binary halftone image; and projecting a desired screen image from said pulse width modulated image.

In yet another embodiment, a method for calibrating a projector display system, said projector display system comprising a light source, a controller, said controller receiving input image data and outputting control signals, a premod modulator receiving control signals from said controller and light from said light source, a blurring optical system receiving light from said premod modulator, and a primary modulator receiving control signals from said controller and light from said blurring optical system, the method comprising: receiving input image data; computing a halftone image; applying a light field model, said light field model based on a PSF model of said blurring optical system; computing a primary image for said primary modulator; displaying a screen image from said primary modulator; capturing said screen image with an image capture device; registering the captured screen image with the premod grid; comparing said registered captured screen image with said input image data; if there are differences greater than a desired amount, then computing a correction to said PSF model; and applying an improved PSF model for further calibration.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 3B, 3C and 3D depict another embodiment of a method for producing a suitable halftone image.

FIG. 4 depicts one embodiment of a technique for generating a pulse-width DMD compensation image.

FIG. 5 is one embodiment of a flow diagram of using premod-to-primary maps, light field models and primary-to-premod maps to produce a primary registered light field.

DETAILED DESCRIPTION

Figure 1:
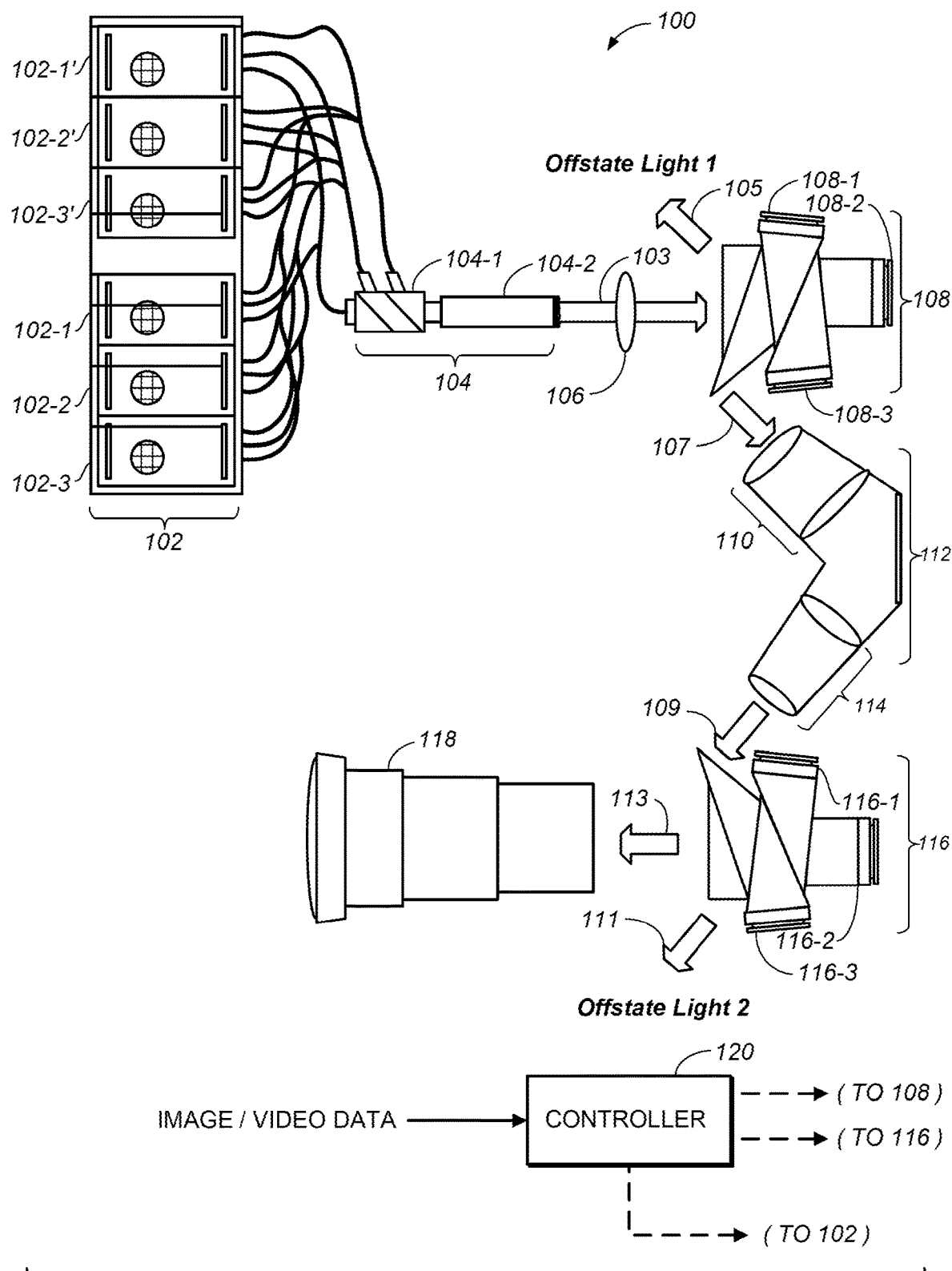
FIG. 1 depicts one embodiment of a multi-modulation display system and environment in which the systems, methods and techniques of the present application may reside.

As utilized herein, terms "controller," "system," "interface," and the like are intended to refer to a computer-related entity, either hardware, software (e.g., in execution), and/or firmware. For example, a controller can be a process running on a processor, a processor, an object, an executable, a program, and/or a computer. A controller may comprise a processor and a system memory and the memory may comprise processor-readable instructions that, when read by the processor, may affect one or more methods and/or techniques disclosed herein. One or more controllers can reside within a process and a controller can be localized on one computer/processor and/or distributed between two or more computers/processor. A controller may also be intended to refer to a communications-related entity, either hardware, software (e.g., in execution), and/or firmware and may further comprise sufficient wired or wireless hardware to affect communications.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Introduction

In the field of projector and other display systems, it is desirable to improve both image rendering performance and system efficiency. Several embodiments of the present application describe systems, method and techniques to affect these improvements by employing light field modeling for dual, or multi-modulation display systems. In one embodiment, light source models are developed and used to advantageous effect. Camera pictures of displayed images of known input images may be evaluated to improve light models. In some embodiments, an iterative process may accumulate improvements. In some embodiments, these techniques may be used on moving images to make live adjustments to improve image rendering performance.

Dual modulation projector and display systems have been described in commonly-owned patents and patent applications, including:

(1) U.S. Pat. No. 8,125,702 to Ward et al., issued on Feb. 28, 2012 and entitled "SERIAL MODULATION DISPLAY HAVING BINARY LIGHT MODULATION STAGE";

(2) United States Patent Application 20130148037 to Whitehead et al., published on Jun. 13, 2013 and entitled "PROJECTION DISPLAYS";

(3) United States Patent Application 20110227900 to Wallener, published on Sep. 22, 2011 and entitled "CUSTOM PSFs USING CLUSTERED LIGHT SOURCES";

(4) United States Patent Application 20130106923 to Shields et al., published on May 2, 2013 and entitled "SYSTEMS AND METHODS FOR ACCURATELY REPRESENTING HIGH CONTRAST IMAGERY ON HIGH DYNAMIC RANGE DISPLAY SYSTEMS";

(5) United States Patent Application 20110279749 to Erinjippurath et al., published on Nov. 17, 2011 and entitled "HIGH DYNAMIC RANGE DISPLAYS USING FILTERLESS LCD(S) FOR INCREASING CONTRAST AND RESOLUTION" and (6) United States Patent Application 20120133689 to Kwong, published on May 31, 2012 and entitled "REFLECTORS WITH SPATIALLY VARYING REFLECTANCE/ABSORPTION GRADIENTS FOR COLOR AND LUMINANCE COMPENSATION".

all of which are hereby incorporated by reference in their entirety.

Exemplary Physical Architecture

In general, a projector with a single Digital Micromirror Device (DMD) may tend to have a limited contrast ratio. To obtain a greater contrast ratio, two or more DMDs and/or other reflectors (e.g., MEMS) may be arranged in series. As a DMD may operate as a time-division or pulse-width modulator, operating two or more DMDs and/or reflectors in series—both acting as pulse-width modulators—tends to require precise time-division alignment and pixel-to-pixel correspondence of time-division sequencing. Such alignment and correspondence requirements may be difficult in practice. Thus, in many embodiments of the present application, projector and/or display systems may employ different dual-modulation schemes to affect the desired performance.

As will be discussed in greater detail in the context of an exemplary projector display system, a first DMD/reflector—referred to as the "pre-modulator" or "premod modulator"—may spatially modulate a light source by means of a halftone image that may be maintained for a desired period of time (e.g., a frame or a portion thereof). This halftone image may be blurred to create a spatially-reduced-bandwidth light field that may be applied to a second DMD/reflector. The second DMD/reflector—referred to as the primary modulator—may pulse-width modulate the blurred light field. This arrangement may tend to avoid both requirements mentioned above—e.g., the precise time-division alignment and/or the pixel-to-pixel correspondence. In some embodiments, the two or more DMDs/reflectors may be frame-aligned in time, and approximately spatially frame-aligned. In some embodiments, the blurred light field from the premod DMD/reflector may substantially overlap the primary DMD/reflector. In other embodiments, the spatial alignment may be known and accounted for—e.g., to aid in image rendering performance.

While the present application is presented in the context of a dual, multi-modulation projection system, it should be appreciated that the techniques and methods of the present application will find application in dual, multi-modulation display systems. For example, a dual modulation display system comprising a backlight, a first modulator (e.g., LCD or the like) and a second modulator (e.g., LCD or the like) may employ suitable blurring optical components and image processing methods and techniques to affect the performance and efficiencies discussed herein in the context of the projection systems.

It should also be appreciated that—even though FIG. 1 depicts a two-stage or dual modulator display system—the methods and techniques of the present application may also find application in 3 or more modulator (multi-modulator) display systems. The scope of the present application encompasses these various alternative embodiments.

FIG. 1 is one embodiment of a dual modulating projector display system 100 suitable for the purposes of the present application. Display 100 may comprise a light source 102—which may comprise one light source (e.g. lamp or the like) or a plurality of point sources of light (e.g., lasers, LEDs or the like). In the context of a digital movie projector, light source 102 in FIG. 1 may comprise one or more banks of laser light sources (e.g., 102-1, 102-2, 102-3; 102-1', 102-2', 102-3'—where there may be a plurality of colored light sources that when combined may render a white light—e.g., red, green and blue).

Light from source 102 may be piped into optical stage 104—which may comprise a combiner 104-1 to combine the light from the RGB laser sources and integrating rod 104-2 which may improve the uniformity of the light. Light 103 may thereafter be transmitted through a diffuser 106 to provide angular diversity to the light. First modulator/pre-modulator 108 may input this light and—under control of controller 120—may provide pre-modulator image processing, as described further herein.

In one embodiment (and as shown in FIG. 1), first, pre-modulator 108 may be a DMD array that—through a set of optical elements may process separate color channels (e.g., 108-1, 108-2 and 108-3 for, e.g., red, green and blue channels). For merely exemplary purposes, pre-modulator 108 may be a 1.2", 2K mirror DMD, using standard prism design. Pre-modulator 108 may be controlled to display a binary half-tone image—e.g., where the pixels are full ON or OFF (where light in the OFF state may be dumped to offstate light 105). In other embodiments, analog Micro-Electro Mechanical System (MEMS) and/or other analog and/or digital reflectors may be suitably controlled to redistribute light to form a different type of image.

This half tone image 107 may be transmitted through a Point Spread Function (PSF) optic stage 112. PSF optical stage may comprise many different optical elements 110, 114 or the like—e.g., lenses, diffusers, reflectors or the like. It will suffice for the purposes of the present application that PSF optic stage receives the half-tone image from the pre-modulator 108 and provide a desired defocusing of the half-tone image (109) to the second modulator/prime modulator 116. As with first modulator 108, second modulator may be a DMD array that—through a set of optical elements may process separate color channels (e.g., 116-1, 116-2 and 116-3 for, e.g., red, green and blue channels). For merely another exemplary purposes, pre-modulator 108 may be a 1.4", 4K mirror DMD, using standard prism design.

Prime modulator 116 may receive light 109 and may be controlled by controller 120. Controller 120 may employ a light field simulation that estimates and/or models the combined effect of half-toning and PSF to determine local brightness on the prime modulator 116 on a pixel-by-pixel basis. In other embodiments, such as those employing MEMS reflectors, controller 120 may similarly model the light field formation. From this model, controller 120 may calculate, estimate or otherwise determine the pixel values for the prime modulator 116 to modify the light field to produce the final projected/rendered image. Light 113 may thereafter be transmitted through projections optics 118 to form a final projected/rendered image on a projector screen (not shown). OFF light may be dumped to offstate light 111.

In many embodiments, a final image may be produced that is the product of the defocused half-tone image and the prime modulator image. In such a final image, contrast may be in the range of 15,000,000:1.

One Embodiment of Optical Processing/Image Processing

Having discussed an exemplary projector display system suitable for the purposes of the present application, it will now be disclosed some methods and techniques for image processing that may affect the improvements in image processing and system efficiencies.

In one embodiment, the projector system may create a binary halftone image, which may be smoothed by optical components to create a reduced bandwidth version of the desired display image. The shape of the optical component PSF may determine the properties of the smoothing function. The shape of the PSF may influence display performance and the computational requirements of the system. In many embodiments, PSF shaping may have one or more of the following attributes and/or the following guidelines:

(1) the PSF may smooth the sparsest halftone pattern to a relatively flat field. This may impose an approximate lower bound on the size of the PSF;

(2) larger PSFs may reduce the spatial frequency at which dual modulation is active and may result in larger "halos" (as discussed further herein). This may require larger computational costs;

(3) the PSF may have limited bandwidth and limited rise-times. Higher bandwidth and rise-times may require greater compensation accuracy and limit computational approximations;

(4) the PSF may be compact and the PSF spatial extent may be limited. The PSF may decay to zero. A slow decay, or strong PSF "tails", may limit image contrast and increase computational requirements;

(5) the PSF may be substantially radially symmetric. Any asymmetry may be accounted for in the computation.

Figure 10:
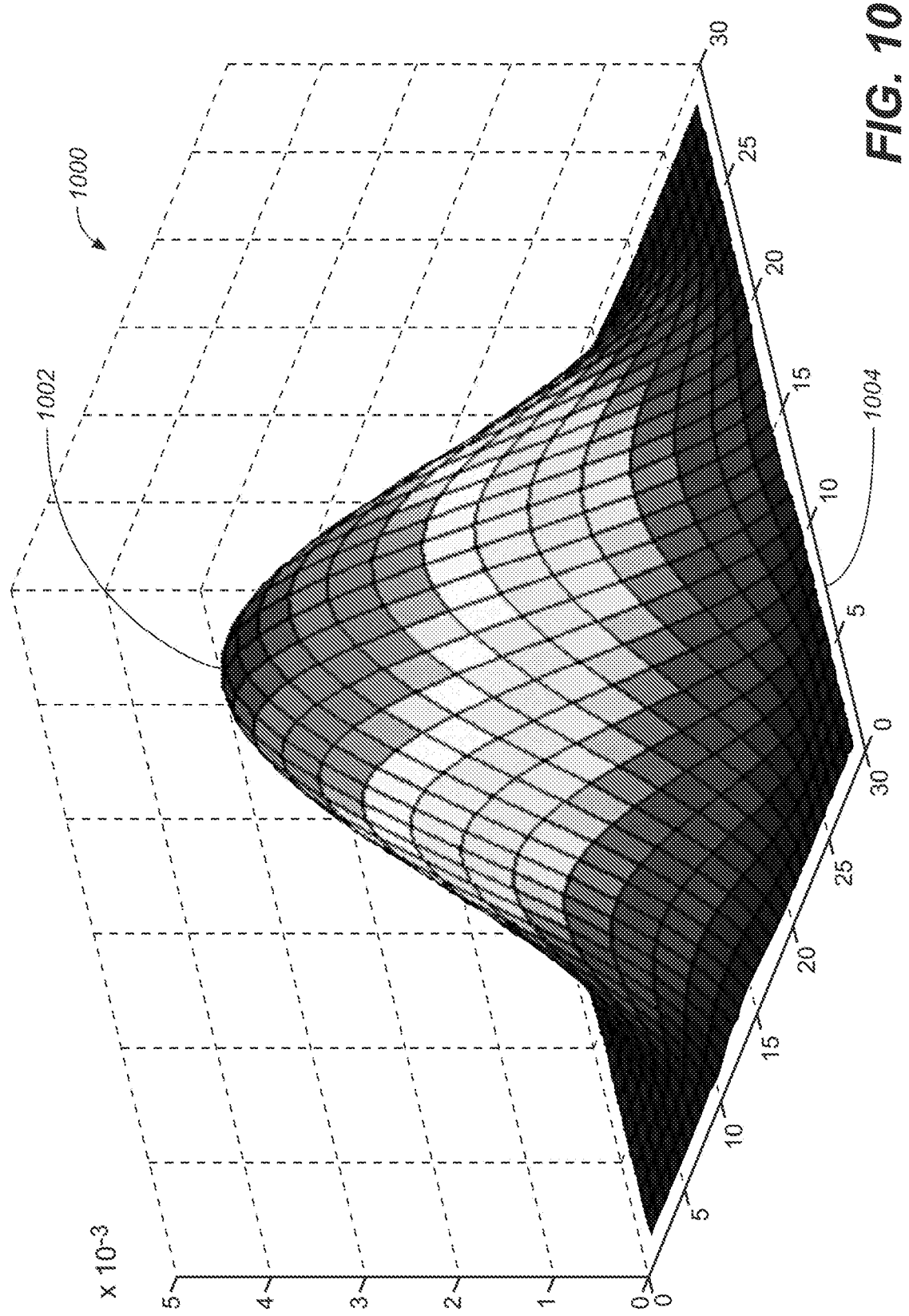
FIG. 10 depicts an example Point Spread Function (PSF) distribution.

In one embodiment, the optically blurred PSF may substantially assume the shape of a Gaussian, or a revolved raised-cosine function, or some other substantially radially symmetric peaked function with limited spatial extent or the like. FIG. 10 depicts one example (1000) of a PSF distribution—which may assume a Gaussian-like peak structure 1002 that may gradually decay, as seen in tail 1004. In many embodiments, the PSF should assume limited spatial frequency, limited rise times and/or limited spatial extent. Spatial frequency and rise times may be usually correlated. Excessive spatial frequency or rise times may require denser sampling and greater modeling precision, increasing computational requirements. If the PSF varies over the image frame, a set of PSFs may be used, and a PSF interpolation method may be employed. PSFs with high spatial frequencies that change with PSF position may require a denser model set for proper interpolation, increasing computational requirements and calibration complexity. It may not be desirable to have sharp spikes or ridges on the PSF pulse. Also, it may be desirable the PSF should gradually decay at its perimeter rather than end abruptly there. A smooth shape will have lower spatial frequencies and longer rise times. The spatial extent of the PSF may determine the size of computation operators. PSFs with broad decaying "tails" may increase operator size and therefore computational requirements.

In merely one exemplary embodiment, the PSF represents the blur function that is applied to—e.g., a 5×5 dither pattern. So, the PSF may be large enough to produce a relatively flat field from a halftone image comprising a 5×5 grid of ones, with all other halftone pixels zero. If the blur function has a substantially Gaussian shape or the like, then its diameter may range from 10 pixels to 20 pixels. In this example, a lower and upper bound may be specified that limits the shape of the PSF. The lower bound may be a raised-cosine pulse and the upper bound may be a Gaussian pulse.

For merely one example, let LB be the lower bound and UB the upper bound. Let "r" be the distance from the center of the PSF, and N the size of the side of the dither pattern, both in pixels. The pulse amplitude may then be scaled by constants $K_1$ and $K_2$ such that the energy for each pulse is normalized to 1, as follows:

$$LB(r)=K_1(1/2+1/2 \cos(\pi r/N)) \text{ for } r<N$$

$$LB(r)=0 \text{ for } r \geq N$$

$$UB(r)=K_2 \exp(-(r/N)^2)$$

As may be noted, the lower bound decays to zero and the upper bound decays as a Gaussian. The decay is significant to avoid the accumulation of too much light from PSF tails. It will be appreciated that many other PSF shapes and functions are possible and that the scope of the present application encompasses all such variations.

Figure 2:
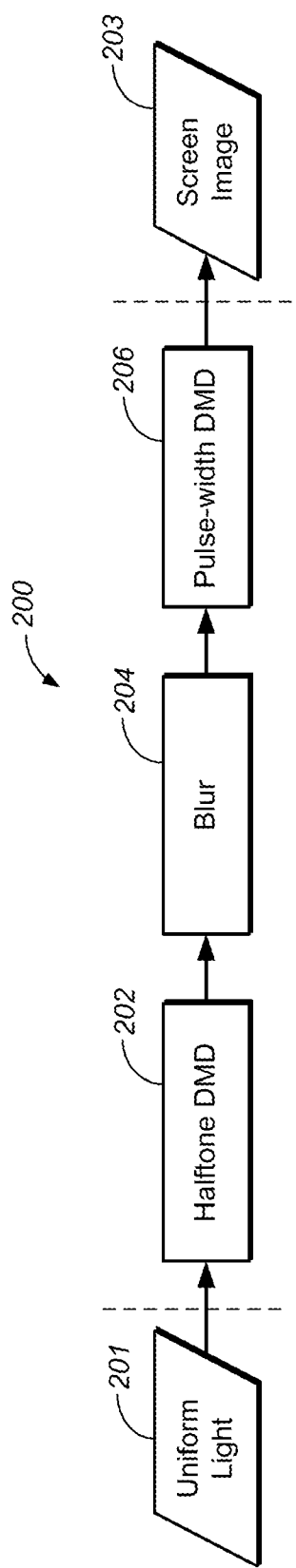
FIG. 2 depicts one embodiment of a high level diagram of the optical processing/image processing that may be affected by the dual, multi-modulator display system, as given in FIG. 1.

Referring attention to FIG. 2, FIG. 2 depicts one embodiment of a high level flowchart 200 for operation of the optical processing/image processing that may be affected with a dual, multi-modulator display system, such as depicted in FIG. 1. Uniform light 201 may be input into the display system and a first modulator 202 (e.g., half-tone DMD or other modulator) provides a half-tone image to blurring optics 204. Thereafter, blurred image may be received by second modulator 206 (e.g., pulse-width DMD or other modulator) further modulates the blurred image to produce screen image 203. In one embodiment, flowchart 200 tracks a set of processor-readable instructions that may be stored in system memory in a controller. A controller may receive image data, produce a half-tone image (e.g. at 202), blur the half-tone image (e.g., at 204) and further modulate the image (e.g., at 206) to produce a final image.

In the context of the display system of FIG. 1, the codewords to each DMD device may be employed as two variables available to control the images produced. In one embodiment, the blur function may be performed by an optic system and may be assumed to be constant for all images. In various display system designs, the design of the blur function and the method of halftone imaging and/or encoding may be related and affect the performance of the display. In one such exemplary system, the following objectives/assumptions might be considered in order to determine a suitable choice of halftone imaging and/or encoding and blur function follow:

(1) The contrast ratio of the display may be greater than the contrast ratio of either DMD alone. However, because of the halftoning and blur function, the full contrast of the display may not be achieved for high-spatial frequency components of an image. Consequently, some bright-clipping or dark-clipping might exist in displayed images. Visual degradation due to light field modeling errors may desirably be minimized.

(2) No bright clipping: In one embodiment, the blurred light field incident on the primary modulator/DMD may be everywhere greater than the input image, the desired screen image. The primary modulator/DMD may attenuate the light field. In some embodiments, some image pixels that are greater than the blurred light field may be bright-clipped. While no bright clipping may be a goal, the blurred halftone image may be substantially brighter than the desired screen image nearly everywhere, and there may be portions of the blurred halftone image that are less bright than the desired screen image and bright clipping is possible.

(3) Limited dark clipping: In one embodiment, the blurred light field may be attenuated by the primary DMD to produce the desired screen image. Because the primary DMD may have a limited contrast ratio, the system may only produce image pixels greater than the blurred light field divided by the primary DMD contrast ratio. In some embodiments, image pixels that are less than this may be dark-clipped.

(4) Small halo: Halos are dark clipping around a bright object on a dark background. Given that a small bright object on a black background is not bright clipped, the blurred light field at the bright object may be greater than the bright object. Because the light field may have reduced spatial bandwidth, it may not be dark very near the bright object. The level of the light field close to the bright object may be reduced by the primary DMD as much as possible, but might still be greater than the desired screen level, causing dark clipping. In some cases, the dark clipping may represent elevated levels above true black, often exhibiting loss of dark detail and loss of contrast. Halos are the primary visual artifact caused by dark clipping, but dark clipping may occur in any local region where the blurred light field cannot represent a high-contrast, high frequency pattern. The spatial extent of a local region may be determined by the bandwidth of the light field which may be determined by the size of the blur kernel or PSF.

(5) Adequate local contrast: The bandwidth of the light field may be determined by the size of the blur PSF. A smaller PSF allows for a higher bandwidth light field. But a smaller PSF must be paired with a denser halftone pattern. A denser halftone pattern may be associated with a smaller dither pattern size; it may have fewer discrete levels and a higher first non-zero level.

(6) The above objectives may compete. As such, many variations and/or embodiments may be possible and/or desirable. This will be discussed further herein with respect to DMD contrast ratios, PSF size and local contrast considerations.

Halftone Imaging and Light Field Modeling Embodiments

On a real display, the blurred light field frame created by the premod DMD may not be aligned with primary DMD frame. The light field image may be slightly rotated, shifted, or scaled to provide overscan at frame edges. It may also be warped due to the blur optic and other optics. For such possibilities, a premod-to-primary map that maps points on the premod DMD to points on the primary DMD may be measured and applied as a mapping—e.g., as a Look-Up Table (LUT) or the like. In a real display, the premod-to-primary alignment may drift due to the average premod image level. The alignment may change slowly in response to a premod image level change and may not be easily predicted. The primary DMD should desirably compensate the blurred light field to produce the screen image by using a model of the light field. The accuracy of the light field model may depend much on the accuracy of the premod-to-primary map used to transfer the blurred light field model from the premod pixel grid to the primary pixel grid for compensation. An inaccurate map, however, may result in strong artifacts in the screen image. The premod-to-primary alignment drift is typically an undesirable property of the display that greatly influences the algorithm used to create the halftone image.

In one embodiment, the control algorithm used to form the screen image may choose premod and primary DMD codewords to form such desired screen images. In this embodiment, choosing premod DMD codewords is akin to choosing the blurred light field, and mostly determines the primary DMD codewords since these should desirably compensate the light field to produce the desired screen image. The blurred light field may be everywhere greater than the input image to avoid bright-clipping, and—when divided by the primary DMD contrast ratio—should be everywhere less than the input image to avoid dark-clipping. Equivalently, the blurred light field should be everywhere greater than a bandlimited upper bound of the input image and less than a bandlimited lower bound times the contrast ratio of the primary DMD. The band-limit requirement is imposed by the halftone encoding and blur function.

In some image regions, the characteristics of the image may be such that the upper bound and lower bound conditions may be satisfied. In other image regions, they may not both be satisfied. In both instances, a choice of light field is presented. When both conditions can be satisfied, there usually exists a range of light fields to choose from. When both conditions cannot be satisfied, a light field may be chosen that violates at least one of the conditions. In one embodiment, violating the lower bound may be usually preferred since bright-clipping tends to be more visually apparent than dark-clipping, but depending on image characteristics, either or both conditions may be violated.

In some embodiments, PSF shape change and premod-to-primary alignment drift may both greatly influence the choice of light field. For a particular image region, there might exist in the set of light fields that satisfy the upper and lower bound conditions a light field that is substantially constant over the region. There may also exist light fields that vary spatially, and some more than others. A light field that varies may be susceptible to modeling errors caused by a premod-to-primary map that does not accurately represent the alignment position or a PSF model that may not accurately represent the PSF shape. A flat light field is relatively unaffected by these effects.

In one embodiment, the algorithm used to choose the light field may be designed to achieve two competing goals. One goal may be to avoid image errors due to bright and dark-clipping; the other goal may be to avoid image errors due to miscompensation by light field modeling errors. When light fields that do not violate the upper and lower bound conditions exist, the algorithm may choose the one that varies least. But it could choose a light field that does violate the conditions but varies much less than that one. This choice might be better because the resulting bright or dark-clipping is visually preferable to the image errors that would be present by inaccurate modeling of the light field that varies more.

To determine the light field, the algorithm may proceed according to the following rules:
(1) For any image region, set the light field to the maximum level unless the image region may be excessively visually degraded due to dark-clipping. Such degradation may be determined by observation, heuristically or any other suitable manner.
(2) For any image region that requires a level other than the maximum level, set the level as near the maximum level as possible and minimize the variation of the light field as much as possible without excessively degrading the region due to bright or dark-clipping.

These rules may be employed and/or modified according to the following reasons and/or conditions:
(1) The image regions that have the light field set to a constant level are not susceptible to compensation errors caused by premod-to-primary misalignment or PSF shape change.
(2) The display may be calibrated at the maximum level. When the light field is held at this level, the premod-to-primary map may accurately represent the alignment and the PSF model may accurately represent the PSF shape. Keeping the light field at this level as much as possible reduces the deviation of the alignment and PSF model. In image regions where the light field is not constant, compensation errors due to light field model errors may be limited. These errors tend to degrade the image excessively.
(3) Many image regions do not have very high contrast and may be achieved at the maximum level with insignificant dark-clipping.
(4) Compensation errors tend to be less visible in darker regions. When the light field cannot be set to the maximum level, the image region is probably very dark.

Halftone DMD Encoding Embodiments

In one embodiment, the pre-modulator/halftone DMD may spatially modulate the uniform light field to produce a halftone image; —e.g., in which all pixels are either ON or OFF for the entire frame time or a portion thereof. The resulting halftone image—appropriately blurred—may produce sufficient light levels on the primary modulator/pulse-width DMD, especially if bright-clipping is desired to be avoided. Since the pulse-width DMD may only reduce light levels, the blurred halftone image should be substantially everywhere greater than the desired screen image—e.g., the input image. In some circumstances when an image feature such as a very bright dot on a black background may force the unavoidable condition of choosing either bright or dark-clipping, some bright-clipping may be intentionally allowed and the blurred halftone image would not be greater than the input, particularly the dot.

In one embodiment, to achieve low light levels and to avoid halos, the blurred halftone image may be set to be slightly greater than the desired screen image. So, the blurred halftone image may substantially be a bandlimited minimum upper-bound on the desired screen image—e.g., with the bandwidth limited by the optical blur. One embodiment (as follows) tends to produce a bandlimited upper-bound on an image. It may not be a minimum upper-bound, but may have a similar performance. This relaxation may be desirable as a true minimum may be harder to achieve, although possible. In this embodiment, it may suffice that the "no bright clipping" property is substantially preserved.

In this embodiment, the halftone image may be formed by using a spatial dither pattern. The dither pattern may be defined over a rectangular block of pixels and may be repeated over the entire image frame by tiling the pattern. The size of the pattern may be related to the size of the blur kernel, since the kernel smoothes the pattern. The size of the kernel may also determine the minimum non-zero light level—e.g., one pixel of the dither pattern turned ON and all others OFF may produce the minimum level.

Table 1 below shows one exemplary 10×10 pattern showing the level indexes. For a given level index, the numbered pixel and all lesser numbered pixels are turned ON while all greater numbered pixels are OFF. When a given level pattern is blurred, the result tends not to be flat and the modulated field may have some minimum. Table 2 below shows the normalized minimum light levels for the each level index of Table 1—showing the light level for the previous index. It will be appreciated that other pattern sizes and other spatial dithering patterns are possible and are encompassed by the present application.

TABLE 1

Spatial Dither Pattern Exemplary

| 1 | 93 | 17 | 69 | 33 | 4 | 96 | 20 | 72 | 36 |
|---|---|---|---|---|---|---|---|---|---|
| 61 | 37 | 77 | 29 | 89 | 64 | 40 | 80 | 32 | 92 |
| 13 | 85 | 5 | 45 | 53 | 16 | 88 | 8 | 48 | 56 |
| 73 | 25 | 65 | 97 | 21 | 76 | 28 | 68 | 100 | 24 |
| 49 | 41 | 57 | 9 | 81 | 52 | 44 | 60 | 12 | 84 |
| 3 | 95 | 19 | 71 | 35 | 2 | 94 | 18 | 70 | 34 |
| 63 | 39 | 79 | 31 | 91 | 62 | 38 | 78 | 30 | 90 |
| 15 | 87 | 7 | 47 | 55 | 14 | 86 | 6 | 46 | 54 |
| 75 | 27 | 67 | 99 | 23 | 74 | 26 | 66 | 98 | 22 |
| 51 | 43 | 59 | 11 | 83 | 50 | 42 | 58 | 10 | 82 |

TABLE 2

Normalized Minimum Light Levels for Table 1 Pattern

| 0 | 0.919914 | 0.159947 | 0.679884 | 0.319955 | 0.029713 | 0.949726 | 0.189717 | 0.709671 | 0.349671 |
|---|---|---|---|---|---|---|---|---|---|
| 0.599925 | 0.35989 | 0.759885 | 0.279915 | 0.879896 | 0.62969 | 0.389651 | 0.789665 | 0.309641 | 0.909666 |
| 0.119936 | 0.839911 | 0.039901 | 0.439936 | 0.519923 | 0.149697 | 0.869623 | 0.069613 | 0.469654 | 0.549684 |
| 0.719902 | 0.239875 | 0.639914 | 0.959919 | 0.199903 | 0.749686 | 0.269715 | 0.669626 | 0.989631 | 0.229615 |
| 0.479913 | 0.399908 | 0.559908 | 0.079919 | 0.799928 | 0.509626 | 0.429714 | 0.589671 | 0.109678 | 0.829687 |
| 0.019936 | 0.939929 | 0.179932 | 0.699874 | 0.339925 | 0.009668 | 0.929686 | 0.169673 | 0.689643 | 0.329627 |
| 0.619936 | 0.379903 | 0.7799 | 0.299927 | 0.899886 | 0.609645 | 0.369611 | 0.769624 | 0.289596 | 0.889622 |
| 0.139927 | 0.859917 | 0.05989 | 0.459925 | 0.539903 | 0.129655 | 0.849579 | 0.049569 | 0.449609 | 0.529644 |
| 0.73988 | 0.25989 | 0.65992 | 0.979956 | 0.21991 | 0.729642 | 0.249675 | 0.649582 | 0.969587 | 0.209571 |
| 0.499944 | 0.419922 | 0.57992 | 0.099932 | 0.819934 | 0.489581 | 0.409674 | 0.569627 | 0.089634 | 0.809642 |

In this embodiment, for any particular input pixel, the level of the corresponding pixel of the blurred halftone image should be greater. To achieve the desired greater level at that pixel, all nearby pixels of the input image within the spatial extent of the blur kernel may be evaluated—e.g., any of those nearby pixels with a level less than the desired level may be turned ON. One embodiment of this method may be affected as follows:

(1) For any particular input pixel, choose a level index such that the level of the full-frame light field is greater than the pixel level. For example, it is possible to choose a level index—e.g., for the entire frame—that creates a halftone pattern that, when blurred, exceeds the pixel level.

(2) Given this full-frame halftone pattern, all pixels whose PSFs do not contribute light to the particular pixel may be turned OFF without affecting the level at the particular pixel.

It should be noted that this method may not produce halftone tiles with particular levels, giving the halftone image a blocky appearance. Rather, individual pixels may be turned ON or OFF, depending on their index and proximity to image features. In other embodiments, it may be possible to affect error diffusion and/or local blue noise—e.g., where the halftone grid may be locally thresholded by the corresponding pixel.

It should be appreciated that while one embodiment may be affected by an ordered dithering, it may be linked with a dilation to achieve an upper-bound. Smoothness may be a concern at the lowest levels—e.g., such as only one pixel on for the dither pattern. It may be possible to apply other approaches, such as blue noise and/or FM-dithering, for different smoothness effects. For another example, consider a small bright object at less than full brightness on black background. In this case, the halo introduced may be wider than desired. The dilation area may not be fully populated with ones. A more compact area with all ones may show less of a halo because halo width of the display is greater than eye glare width. Reducing the brightness of small bright objects may reduce halo width, rather than just reduce halo brightness.

Figure 3A:
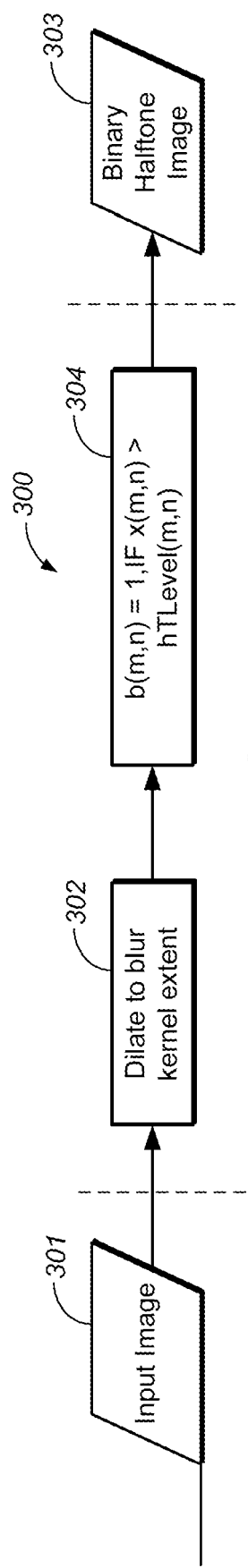
FIG. 3A depicts one embodiment of a method for producing a suitable binary halftone image.

FIG. 3A shows one embodiment of a method for producing a suitable binary halftone image. Halftone image module 300 may receive input image data 301 and may dilate the image data to the extent of the blur kernel at 302—to produce $x(m,n)$, the dilated input image. The resulting binary half-tone image, $b(m,n)$, may be set to $b(m,n)=1$, if $x(m,n) > \text{htLevel}(m,n)$—where $\text{htLevel}(m,n)$ may be given as the values in Table 2 as the map—e.g., tiled over the entire image frame. The binary half-tone image may be returned as $b(m,n)$. The embodiment as depicted in FIG. 3A may be employed if the light field under specialized and/or simplified conditions—e.g., when the light field is turned fully ON.

In one embodiment, the dilation operator may be employed to achieve close to the min upper bound. Other embodiments may employ nonlinear filters that may provide a max of elements under the kernel.

Embodiments Employing Upper and Lower Bounds

In situations in which the light field may be other than fully ON (e.g., the light is some greyscale value less than fully ON, for reasons discussed herein), then it may be desirable to employ upper and lower bounds.

FIG. 3B depicts one method for determining an upper bound of a binary halftone image. Input image 301 may be input into block 302 that dilates to blur kernel extent. That intermediate result may be subject to the threshold in

304b—i.e., b(m,n) may be set to x(m,n), if greater than hTLevel(m,n). This block would set the upper bound binary halftone image at 303b.

In one embodiment, if the upper bound binary halftone image is found by this method, then it is likely that no input image pixel will be bright-clipped. However, some pixels may be dark-clipped.

FIG. 3C depicts one method for determining a lower bound of a binary halftone image. The lower bound binary halftone image is found similarly to the upper bound image. The same dither pattern and threshold map may be used with an offset of one level added to each threshold. Rather than dilating the input image, it may be eroded. Erosion is a process similar to dilation, except that erosion may occur around the dark pixels. For example, if the system inverted the image and then performed dilation normally and then re-inverted the resultant image, the result would be an erosion of the image. For dilation, in some region near a pixel defined by some shape such as a disk, it is possible to set the other pixels to this pixel's level if it is greater. For erosion, it is possible to do the same, except set the other pixels to this pixel's level if it is less. Dilation tends to set a pixel to the maximum in a local region; erosion tends to set a pixel to the minimum in a local region. After that, rather than turning halftone pixels on when corresponding dilated image pixels are greater than thresholds, they may be turned off if less than thresholds.

In FIG. 3C, the input image 301 is multiplied (at 306) by the contrast ratio of the primary DMD 305 to establish the light field level at which the primary DMD may achieve the lower bound. The image may be eroded in 302c and may be thresholded as depicted in 304c. This scaling of the input image greatly increases the image levels and very often in common images makes the levels greater than the maximum light field level. The light field can be set to the maximum level everywhere this is true.

If the lower bound binary halftone image is found by this method, no input image pixels will likely be dark-clipped, but some may be bright-clipped.

Combining Upper and Lower Bounds for Form the Halftone Image and Light Field

The upper and lower bound binary halftone images may be combined to form the halftone image and light field according to rules described herein. As depicted in FIG. 3D, the upper bound image 303b and lower bound image 303c may be pointwise OR'ed (at 302d) such that the binary halftone image (303d) may be the greater of the upper bound and lower bound images.

If the upper and lower bound binary halftone image are combined by this method, no input image pixels will likely be bright-clipped, but some may be dark-clipped. The blurred light field level may be set to the greatest level permitted by the upper and lower bound methods such that no bright-clipping exists but dark-clipping may exist due to the limited spatial bandwidth of the light field.

Alternative Upper Bound/Lower Bound Method Embodiments

For alternative embodiments, several enhancements may be applied that may improve image quality. For example, in the method described above, there may be created a strict upper bound light field image. However, in some image regions, limited bright-clipping might be preferred in exchange for less dark-clipping for one possible upper bound enhancement. An example image feature is a small bright dot on a very dark background such that a visible halo is present.

For some lower bound enhancements, it should be noted that the method described above may create a strict lower bound light field image. However, in most images, a strict lower bound is not necessary. Due to veiling eye glare, an observer will perceive many very low-level pixels to be at a higher level. Often, raising some low level pixels can be perceived, but does not appreciably degrade the image, especially dark pixels in bright areas.

In an image region, the level of the darkest pixels directly determines the amount of image area that can set to the maximum light field level. Displaying a pixel at less than the level attainable by the primary DMD alone requires lowering the light field. Some amount of dark-clipping may be preferred instead of image errors due to premod-to-primary alignment or PSF shape change. Exchanging some dark-clipping for more maximum light field area is often a favored trade-off.

One possible enhancement is to use a veiling glare function to determine how high the lower bound can be raised such that dark-clipping cannot be perceived. This method tends to raise the light field such that it is at maximum for more image area.

Another possible enhancement is to use a "safe contrast ratio" rather than a strict lower bound. Compared to the strict lower bound, this method tends to raise the light field such that it is at maximum for more image area. Rather than use the lower bound times the primary DMD contrast ratio to determine the maximum the light field may be, a contrast ratio for a local region is chosen to be sufficient, or "safe", for the purpose of allowing dark-clipping with the assumption that it will not be perceived visually. Instead of the lower bound times the primary CR, an average of a local region times the "safe contrast ratio" is the maximum the light field may be. By using a lower "safe contrast ratio"—rather than using the primary DMD contrast ratio, there may tend to reduce the image errors from premod to primary alignment or PSF shape change, possibly at the expense of high spatial frequency dark-clipping. In addition, using a smaller erosion operator may be useful in reducing the image errors due to premod to primary alignment or PSF shape change.

Light Field Model and Pulse-width DMD Embodiments

The primary modulator/pulse-width DMD modulates the blurred halftone image light field to produce the desired screen image. The Pulse-width DMD can only attenuate light—so the light field may be an upper bound on the desired screen image to prevent bright clipping. In addition, to prevent dark clipping, the light field may be a minimum upper bound. The blurred halftone image light field may be computed, estimated or otherwise modeled using a model of the optical process. In one embodiment, the optical process may be assumed to be only the blur—e.g., the pre-modulator-to-primary modulator alignment may be ignored. In some embodiments, this may be the overall registration error.

FIG. 4 depicts one embodiment of a technique for generating a pulse-width DMD compensation image. Binary half-tone image (303, e.g., from FIG. 3) may be input into a blur model 402 and may be reciprocated at 404. The pulse-width DMD compensation image may be determined by dividing the input image by the modeled blurred halftone image light field—e.g. multiplying (at 406) the input image 301 by the reciprocal of the blurred half-tone image light field.

Embodiments for Accommodating Varying PSF Shapes

On the real display, the PSF shape for a given premod pixel may depend on its position on the premod frame. The blur optic may not blur all premod positions the same. The PSF for pixels in a local area may be assumed to vary little and all pixels may be assumed to have the same energy (e.g., given a uniform light field incident on the premod). However, on a real display, each PSF may tend to be different. In one embodiment, for a 2K frame, each PSF may be modeled separately, and/or applied to a local portion of the image area—e.g., resulting in 2 million PSFs that might be captured, stored, modeled, and used computationally. Other embodiments may provide a simplifying model to reduce this complexity. Because the PSFs in a local region tend to be similar, a single PSF model is used to represent all PSFs—e.g., at least in local areas and/or local portions of the image area. Such, potentially localized, PSF models may be measured or otherwise modeled to provide suitable PSF models.

Light Field Model Embodiments

The primary DMD compensates the blurred light field to produce a final screen image. In one embodiment, light field compensation may be performed on the primary DMD pixel grid. For this compensation process, the blurred light field may be represented on the primary pixel grid. However, the light field is formed by blurring the halftone image which is on the premod pixel grid. In addition, the premod and primary modulators may not be aligned.

To affect a suitable compensation process, there are two possible alternative embodiments from which to choose. A first embodiment might be to model the light field on the premod grid and then map it to the primary grid. A second embodiment might be to model the light field on the primary grid by modeling the PSFs associated with each premod pixel on the primary grid. While the present application encompasses both alternative embodiments, it will now be described the first embodiment—i.e., to modeling the light field on the premod grid and map it to the primary grid. In one embodiment, it may be possible to map points on the primary grid accounting for geometric and/or optic distortions.

This first embodiment may be selected for the following reasons:
(1) because the PSF may substantially maintain its shape in a local area. Thus, the light field may be modeled in the local area on the premod by a standard convolution process on the halftone image using a single PSF for the entire area.
(2) because of the premod-to-primary misalignment, the PSFs in a local area on the primary may have different sample phases and these may need to be accounted for. In some embodiments, because the premod and primary may not be aligned, there may be some sample-phase shift moving the inherently premod-grid-aligned PSF models to the primary grid.
(3) If modeled on the primary, even though the PSF shape does not change in a local area, different PSFs may need to be used when computing the convolution because of the sample phase change.
(4) The PSFs are inherently premod referenced. More PSFs would need to be modeled and recorded for the primary than for the premod.
(5) Modeling the light field may tend to be computationally costly. For a practical implementation, the PSFs may need to be subsampled and approximated. This might be simpler if performed on the premod grid.
(6) Mapping the modeled light field from the premod to the primary has a computational cost, but it may be less than the cost of modeling the light field on the primary.
(7) Modeling the light field on the premod may be affected by mapping the modeled light field from the premod to the primary. It may be desirable that this map be accurate.

For a particular display, the premod-to-primary alignment is fixed. If the map has errors, they may be fixed. For example, the errors may be accounted for by modifications to the PSFs during the calibration process—e.g., an offset error in the map may be countered by an offset in the PSF model at that frame position.

In addition, because of premod-to-primary misalignment, the input image may be mapped to the premod grid for the process of computing the halftone image. This process may not require as much accuracy as mapping the light field to the primary. FIG. 5 depicts the afore-mentioned first embodiment. The system—under controller direction—may receive input image 301. A primary-to-premod mapping 502 may be applied prior to computing the half tone image at 504. A light field model may be applied at 506 and then a premod-to-primary map at 508 may be applied to produce a primary registered light field 503. In some embodiments, the primary may be one resolution (e.g., 4K) and the premod may be another resolution (e.g., 2K); but processing may be able to affect other mappings. For example, the processing may affect 2K/2K mapping—but the 2K primary may be upconverted to 4K by the projector system. Other mappings are, of course, possible.

Frame Partitioning for Light Field Model Computation

Figure 6:
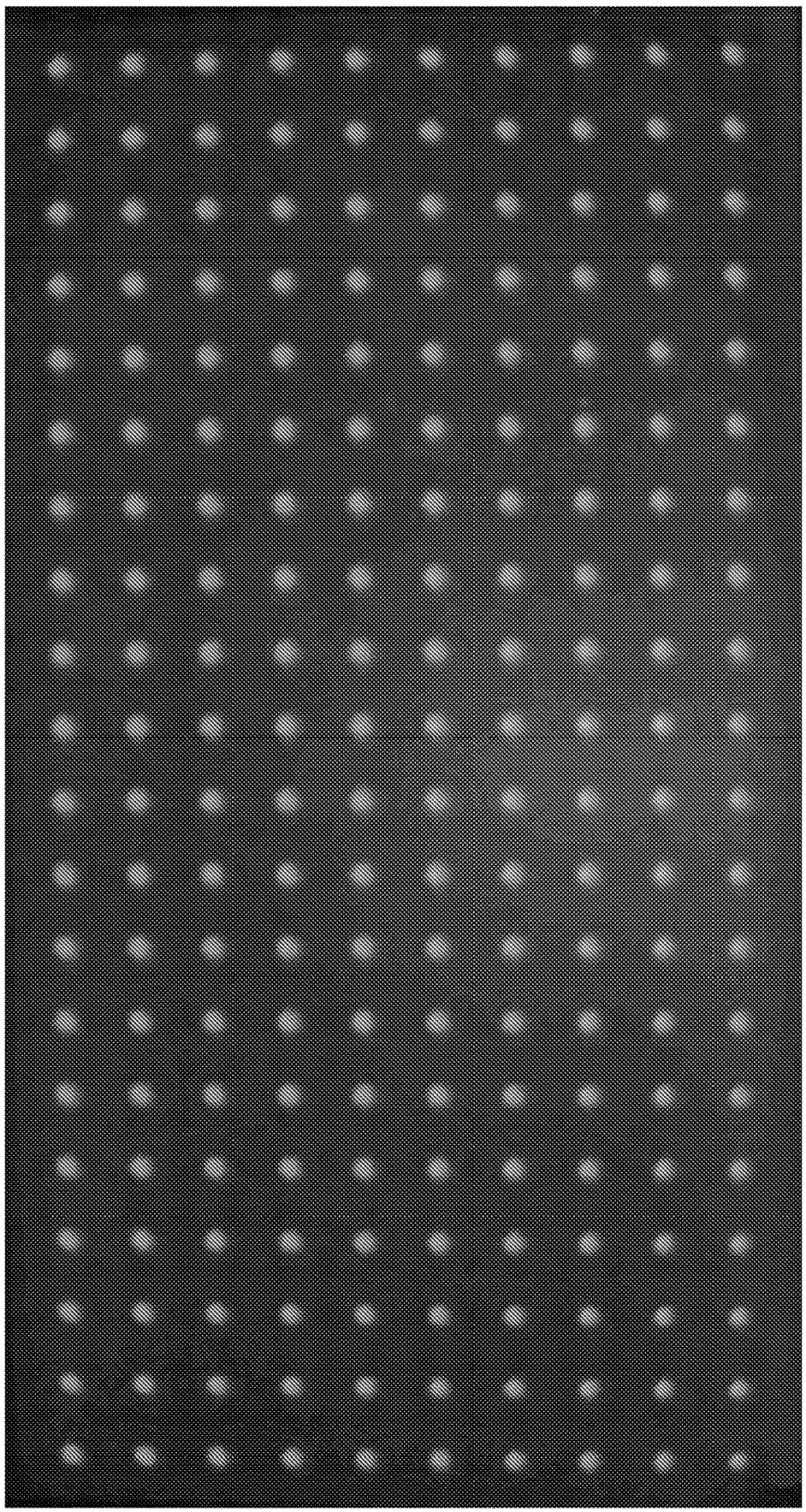
FIG. 6 depicts an array of PSFs that may be captured, modeled, and used to compute a colored (e.g. red, green or blue) light field.

As mentioned above, since the PSF may be substantially unchanged within a local area, the same PSF model may be used in a local area to compute the light field. Thus, the image frame may be partitioned into rectangular regions and each region may be processed using a PSF that best represents the PSFs in that region. After each region is modeled, the regions may be joined together to form the full-frame light field. If the seams are visible, either more regions may be used—or overlapping regions may be computed and then blended together. FIG. 6 depicts an array of PSFs that may be captured, modeled, and used to compute a colored (e.g. red, green or blue) light field. The frame may be partitioned so that the PSFs are at the center of each region.

Temporal Repositioning of Halftone Pattern

In one embodiment, a halftone dither pattern may be tiled over the image frame. The choice of position or phase of the pattern on the frame may vary accordingly. Since the screen image may have errors due to light field modeling or other causes, the dither pattern may be repositioned each frame—e.g., so that errors may be disguised. For example, the dither pattern may be repositioned each frame according to the pattern indexes. As errors may be periodic with the dither pattern tile size, moving the pattern around according to the indexes may be affect hiding errors satisfactorily. The dither pattern may also be repositioned to disguise the light field modeling errors caused by the sparsest halftone bit patterns; these bit patterns might cause the most visible errors because they, when blurred, tend to produce light fields that vary more than denser bit patterns.

Overview of PSF Adjustment and Display Calibration

In practice, a real display may need to have its PSF shape adjusted and may need to be calibrated. In one embodiment, PSF adjustment may be performed before the calibration—e.g., by manipulating optical components. After a suitable PSF adjustment, the calibration process may occur for each color channel to measure and record the premod-to-primary map and the PSF model set. For calibration, a camera may be used to take pictures of the screen while calibration images are displayed.

In one embodiment, to measure the premod-to-primary map, pictures of two different calibration images may be taken. The first calibration image may be a PSF array image that is formed by displaying a dot array on the premod with the primary fully open. The premod pixel positions of the dots are known. This combination shows a screen image of an array of PSFs, as depicted in FIG. 6. The second calibration image may be a dot array image that is formed by displaying a dot array on the primary and all ones on the premod. The primary pixel positions of the dots are known. This combination shows a screen image of an array of dots.

Pictures of these two images may be taken without moving the camera. Since the premod and primary pixel positions of the dots are known, a camera-to-premod map and a camera-to-primary map are found. These two maps may then be composited to form the premod-to-primary map for the color channel. If the camera is not moved between pictures taken for each color channel, the camera-to-primary maps for the different color channels may be used to align the primary DMDs with each other, aligning the color channels with each other.

To find an initial PSF model set, the first calibration image may be used, as depicted in FIG. 6. The camera-to-premod map may be used to map the PSFs to the premod grid, where they are recorded to form the PSF model set. The models are referenced to the premod grid because that is where they are used to construct a model of the blurred light field. For the purpose of constructing the blurred light field, each PSF in the set represents all the PSFs in its local processing region. Acquiring models of PSFs this way can easily result in models with significant errors.

During the calibration process, the premod-to-primary alignment and PSF shape should preferably be held constant. Because the algorithm attempts to keep the premod image at maximum level (white), a white premod image is used to hold the alignment and shape change constant. Before the calibration process begins, the display is conditioned with the white premod image. The dot test patterns may not have white premods, so the dot patterns are displayed only long enough to take pictures and then the white premod image is reapplied to maintain constant conditions.

Additional Display Calibration Embodiments

As mentioned, display calibration may include the process of creating a PSF model set. The initial PSFs may be acquired by taking pictures of individual PSFs displayed on the screen.

However, acquiring models of PSFs in this way may result in models with significant errors. Since the PSF models may be used to model the real light field incident on the primary DMD, it may be desired that they accurately represent the real PSFs. In some dual DMD modulator projector systems, these systems may have relatively small PSFs with steep slopes, which may need accurate models. In one embodiment, it may be possible to create a PSF model refinement as a process of improving existing PSF models by evaluating the errors produced when the models are used to display screen images.

In one embodiment, a single PSF may be captured by camera. This PSF image may be used as the preliminary model of the PSF for the halftone pixel that produced it. As it may not be a perfect representation of the real PSF, when it is used to model the light field produced by the halftone image, the light field may have errors.

For a particular image, the light field may be formed by the superposition of all the PSFs produced by the halftone pixels that are ON. Such PSF model errors may produce light field errors depending on the distribution of ON-pixels in the halftone image. Some images may be more susceptible to PSF errors than others. Generally, images that produce a relatively flat light field may be less susceptible to PSF model errors, and images that produce a varying light field may be more susceptible.

Figure 7A:
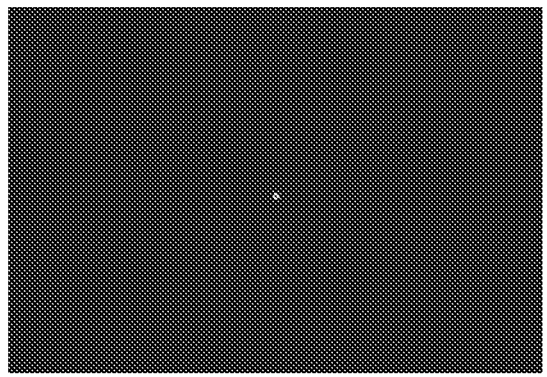
FIGS. 7A through 7F depict an exemplary rendering of an input image through the various processing modules of the present application.
Figure 7B:
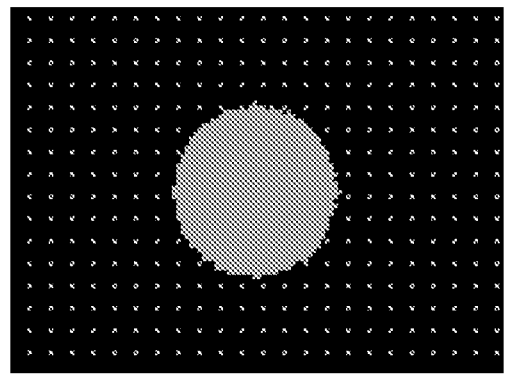
Figure 7C:
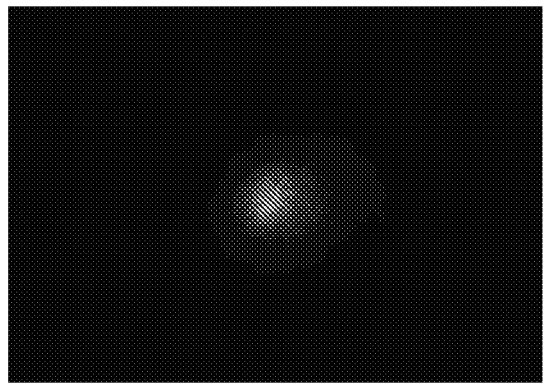
Figure 7D:
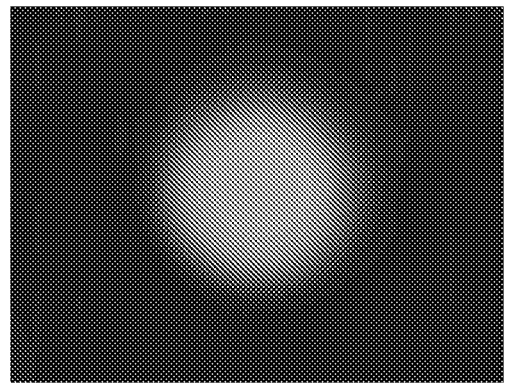

FIGS. 7A to 7F are exemplary images to illustrate PSF modeling and refinements. FIG. 7A depicts a single area illuminated within an input image. FIG. 7B depicts the half-tone image generated in response to input image FIG. 7A, according to the various embodiments disclosed herein. In this example, the halftone image is placed on a sample 2K grid. It should be noted that this half-tone image is substantially known to the display system. FIG. 7C depicts a single pixel PSF on the premod grid, as blurred by the optic system. FIG. 7D depicts the half-tone image of FIG. 7B, as blurred.

Figure 7E:
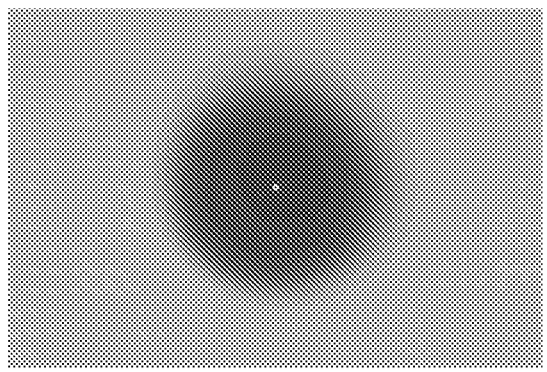
Figure 7F:
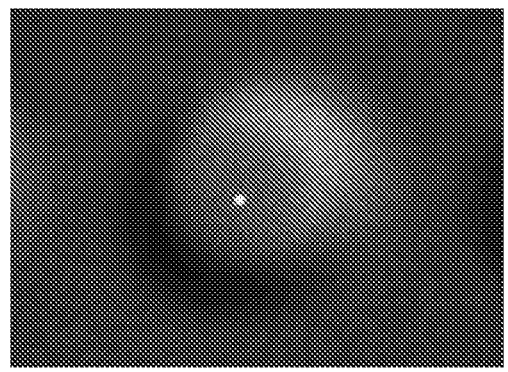

FIG. 7E depicts the primary DMD compensation image. It should be noted that the input image would be represented by the bright center dot/region—while a halo would form an annular region surrounding the bright center dot/region to compensate for the blurred light field. FIG. 7F depicts the resulting screen image after the compensation of FIG. 7E is applied in order to form the screen image. It should be noticed that the screen image may not be radially symmetric, as the system may be correcting the two errors as previously mentioned herein. Ideally, the screen image should appear to be the same as the input image, but it exhibits an artifact in FIG. 7F. In this example, the primary DMD compensation is assumed to be correct and the artifact is a result of an improperly modeled light field caused by an inaccurate PSF model.

PSF Refinement Embodiment

As mentioned, visible artifacts may be captured by camera. When the captured image is registered with the premod light field and halftone image, it may be used to find a correction to the PSF that may tend to reduce the artifact. The captured image of the artifact may also have errors and not be a perfect representation of the real artifact. So the PSF correction may improve the PSF model but may not completely eliminate the artifact. Using an improved PSF, the image may be reprocessed and the screen image should exhibit a reduced artifact. These steps can be repeated to iteratively reduce the artifact until it is not visible.

Figure 8:
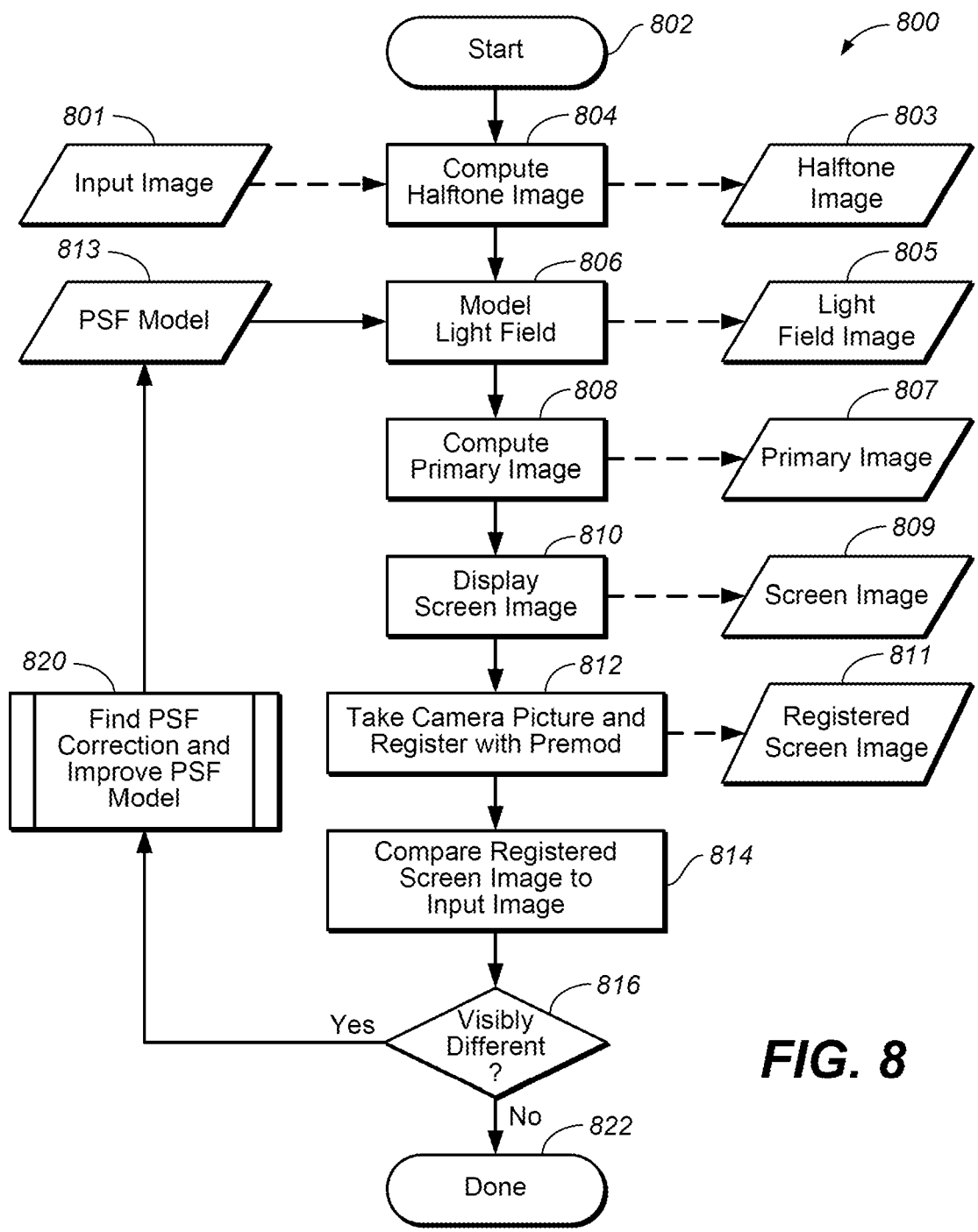
FIGS. 8 and 9 depict one embodiment of the image rendering process and a refinement process for potential continuous correction/improvement of the system.
Figure 9:
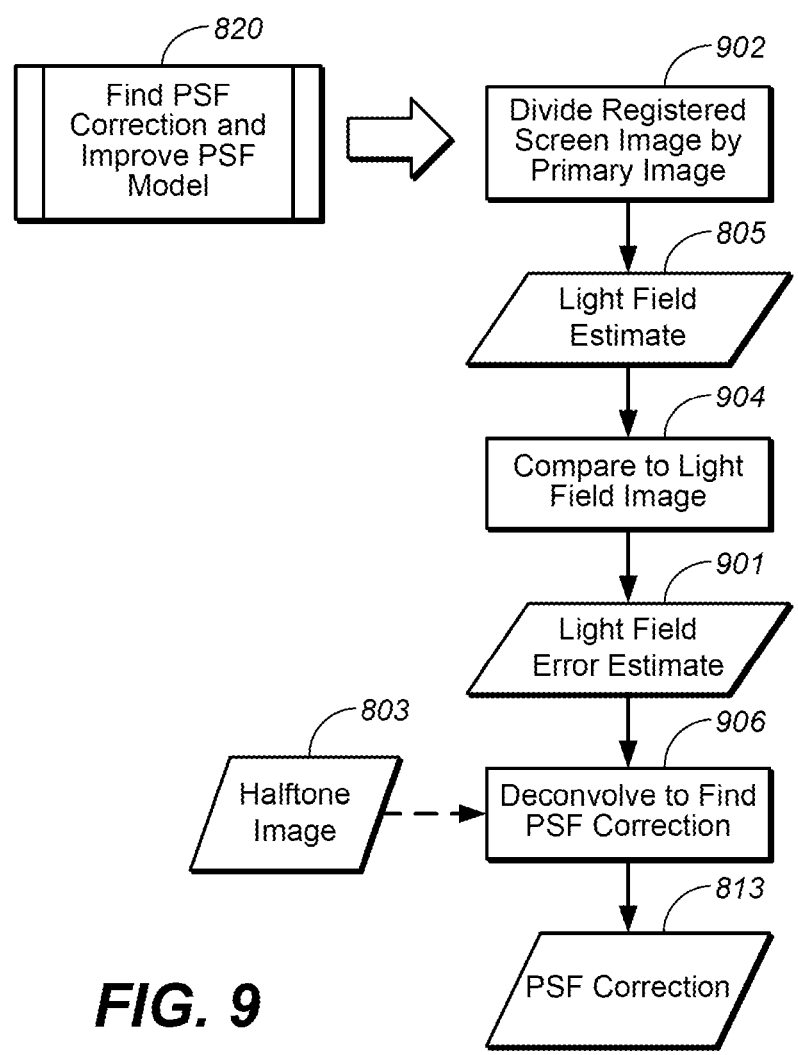

FIGS. 8 and 9 show one possible embodiment of a PSF model refinement process and/or module. It may be appreciated that such a PSF model refinement process/module may be employed one time, multiple times—or possibly as part of a continual improvement process that may improve the accuracy of the rendering of desired images during the course of operation. As the system starts at 802, an initial PSF model (813) may be used to display the screen image. Tracking various embodiments disclosed herein, input image data 801 may be used to compute a halftone image at 804, resulting in halftone image 803. This halftone image may be used, together with the latest PSF model 813—to compute and/or model the light field image 805. In one embodiment, such a light field image may be generated by convolving the PSF and the halftone image. Light field image 805 may be used to compute primary image (at 808)—to produce primary image 807. Primary image may be used to display screen image (at 810)—to produce screen image 809.

Once the image is rendered as a screen image, a camera picture may be taken at 812 and the screen image may be registered with the premod pixel grid (at 812)—to produce registered screen image 811. This registered screen image may be used for comparison (at 814) to the input image. A controller/processor may query whether there are any differences between the registered screen image to the input image at 816. These differences may be thresholded and/or computed to determine if the difference are greater than a desired amount—e.g., that might be visible for viewers of the screen image. Alternatively, differences may be judged by human viewers. If not, then the process may terminate at 822—or continue as a corrective process to run continuous process, or run at a desired time periods.

If there are differences detected at 816, then the system may find and/or compute a PSF correction and improve the PSF model at 820. FIG. 9 is one embodiment of a process of computing the PSF correction. At 902, the process/module may divide the registered screen image by the primary image. This produces a light field estimate at 805. This light field estimate may then be compared with the light field image at 904. This produces a light field error estimate 901. This estimate, together with the halftone image, may be deconvolved—and/or computed as an inverse—to find a suitable PSF correction (as 813). This PSF correction may then form the new PSF model to be used in FIG. 8.

In general, images derived from the camera picture are estimates because of the uncertainty in the camera capture process. The light field may be produced by the superposition of the PSFs of all the on-pixels in the halftone image. The deconvolution process attempts to find a PSF correction from the estimated light field error by assuming the same PSF for all on-pixels contributing to the artifact.

Alternative Embodiments from Competing Considerations

As mentioned above, certain assumption and objectives may be used to produce the new image rendering techniques described herein. As mentioned, different assumptions and objectives may lead to alternative embodiments. Such alternative embodiments may be based in DMD contrast ratios, PSF sizes and local contrast. For example, the first nonzero premod level may be achieved by superimposing a field of PSFs to achieve a relative flat light field. The relative flat field may be achieved if the PSFs are spaced densely enough—as spacing them too far apart may result in a field with peaks and valleys that may be large relative to the desired field level. Given PSF size and shape, the PSF spacing desired to create a relatively flat field may determine the spacing of the halftone pixels that may be turned on to achieve the first nonzero premod level. This spacing may determine the first nonzero level and the number of discrete linear premod levels.

For example, a PSF that is repeated on a 10×10 pixel grid, to achieve a relatively flat field, may require 1 of 100 premod pixels be turned ON. The first nonzero level will be 1/100, the halftone tile size will be 10×10, and the number of discrete levels will be 101.

The name first nonzero level indirectly implies that the first level, zero, is 0/100. It may not be, in practice. Unlike all the nonzero levels, this level may not be determined by the halftone fraction, but by the premod DMD contrast ratio (CR). The level is 1/premodCR and may likely not be at a level for best performance.

To limit halo size on small bright features, a small PSF and complimentary small halftone tile size may be chosen. But the small tile size limits the number of discrete premod levels. This may not be a concern at higher levels, but might excessively restrict local contrast at lower levels, particularly levels less than the first nonzero level. Use of the zero level depends on the premod DMD CR; a greater CR may not be better. Also, depending on the first nonzero level, the zero level might be needed to achieve the desired full system CR, achieve black.

Some image features may have spatial frequencies greater than those that can be represented by the premod light field. For these image features, the premod light field may be constant, un-modulated. The level of the premod light field may be determined by the local max of the image feature; the level may be a discrete premod level that is greater than the local max to avoid bright-clipping. The primary DMD may reduce the premod light field to produce all levels of the local image feature. Depending on the premod zero level (determined by the premod CR), the first nonzero level (determined by the halftone tile size), and the primary DMD CR, the primary DMD might not have sufficient contrast to produce the lowest levels, limiting the local contrast of that image feature enough to affect its appearance.

Exemplary Images

Figure 11A:
FIGS. 11A-D depict one exemplary image as may be processed by an embodiment of the present application.
Figure 11B:
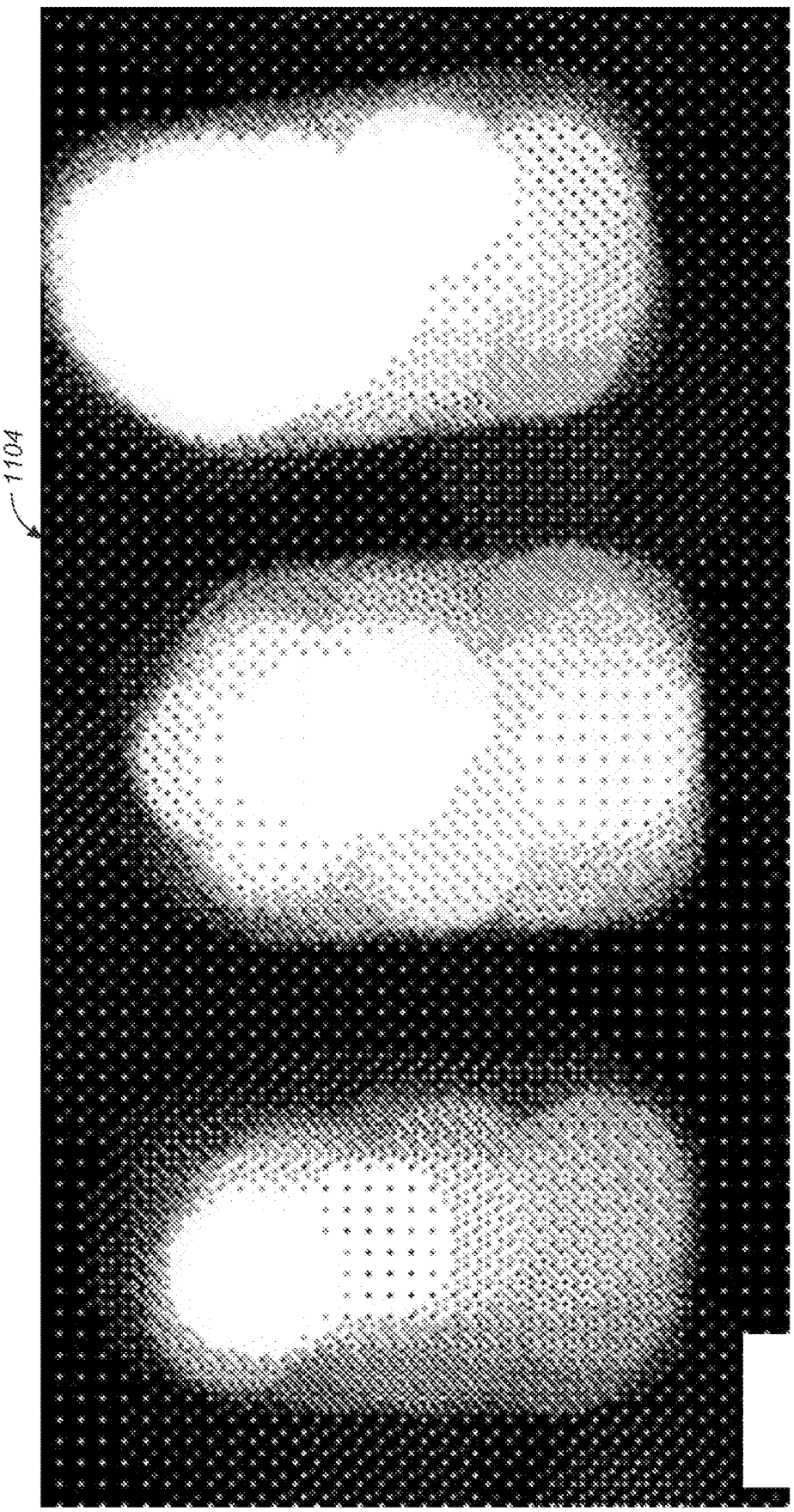
Figure 11C:
Figure 11D:
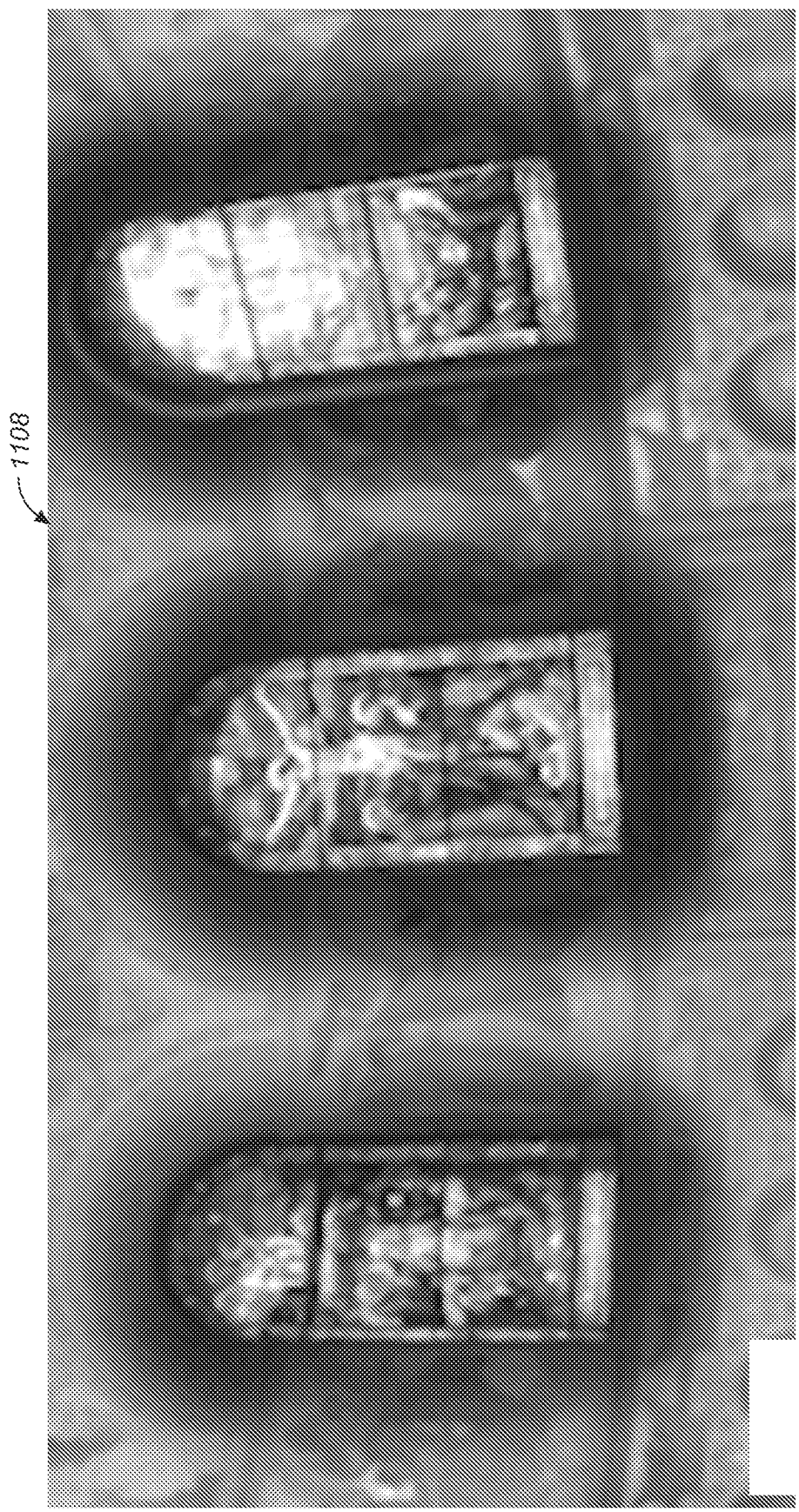

FIG. 11A is one exemplary image 1102 that depicts a desired source image to be rendered by the present system and the methods and/or techniques described herein. As shown, the image is one of church interior that has dark regions with details on the wall. In addition, there are brightly lit window regions that also exhibit lots of detail therein. FIGS. 11B and 11C depict the upper bound halftone image and the blurred upper bound image, respectively as described herein. FIG. 11D depicts the final rendered image as might be produced by one embodiment of the present system.

Figure 12A:
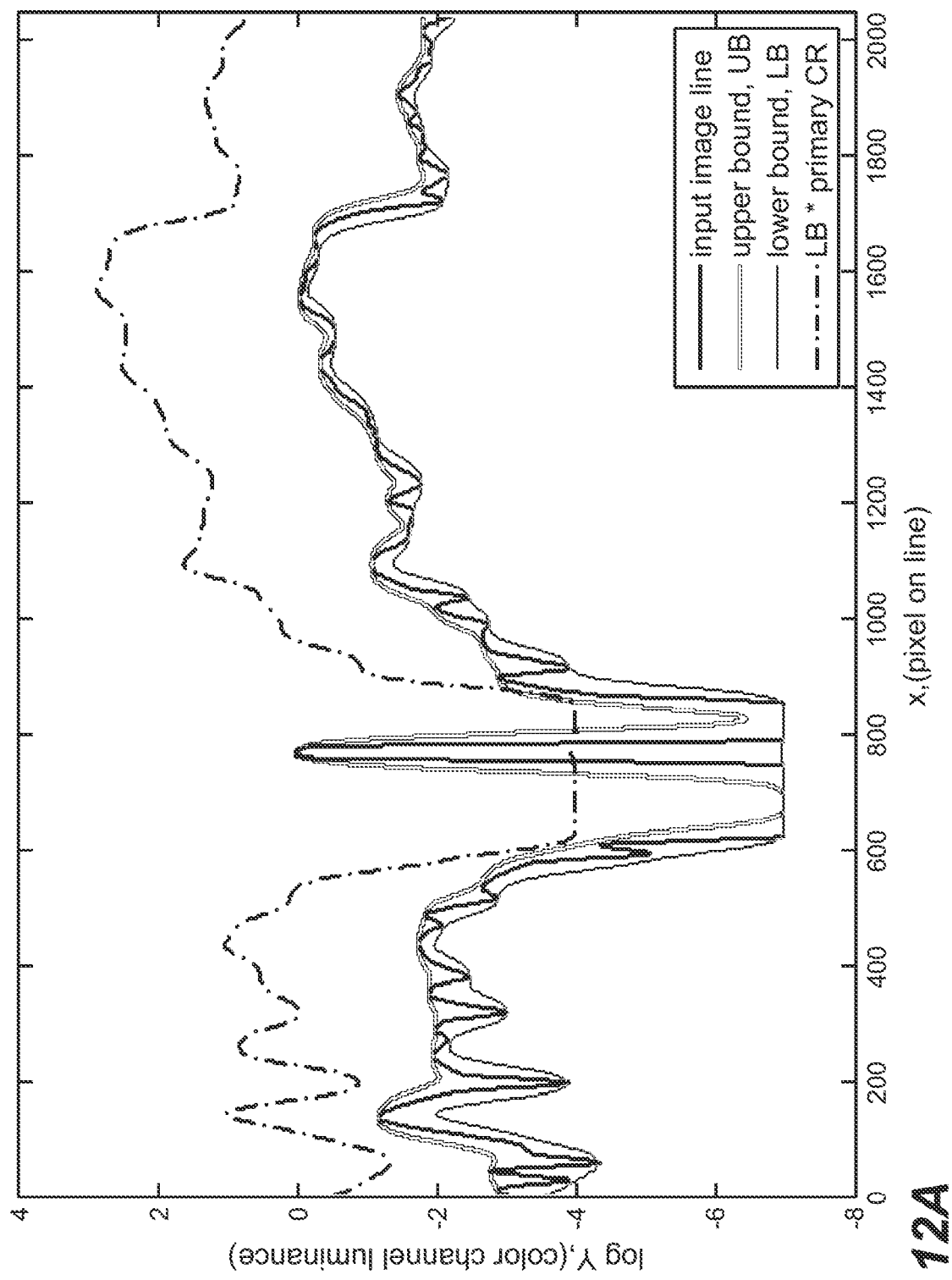
FIGS. 12A and 12B depict two charts of image processing based on exemplary input image data.
Figure 12B:
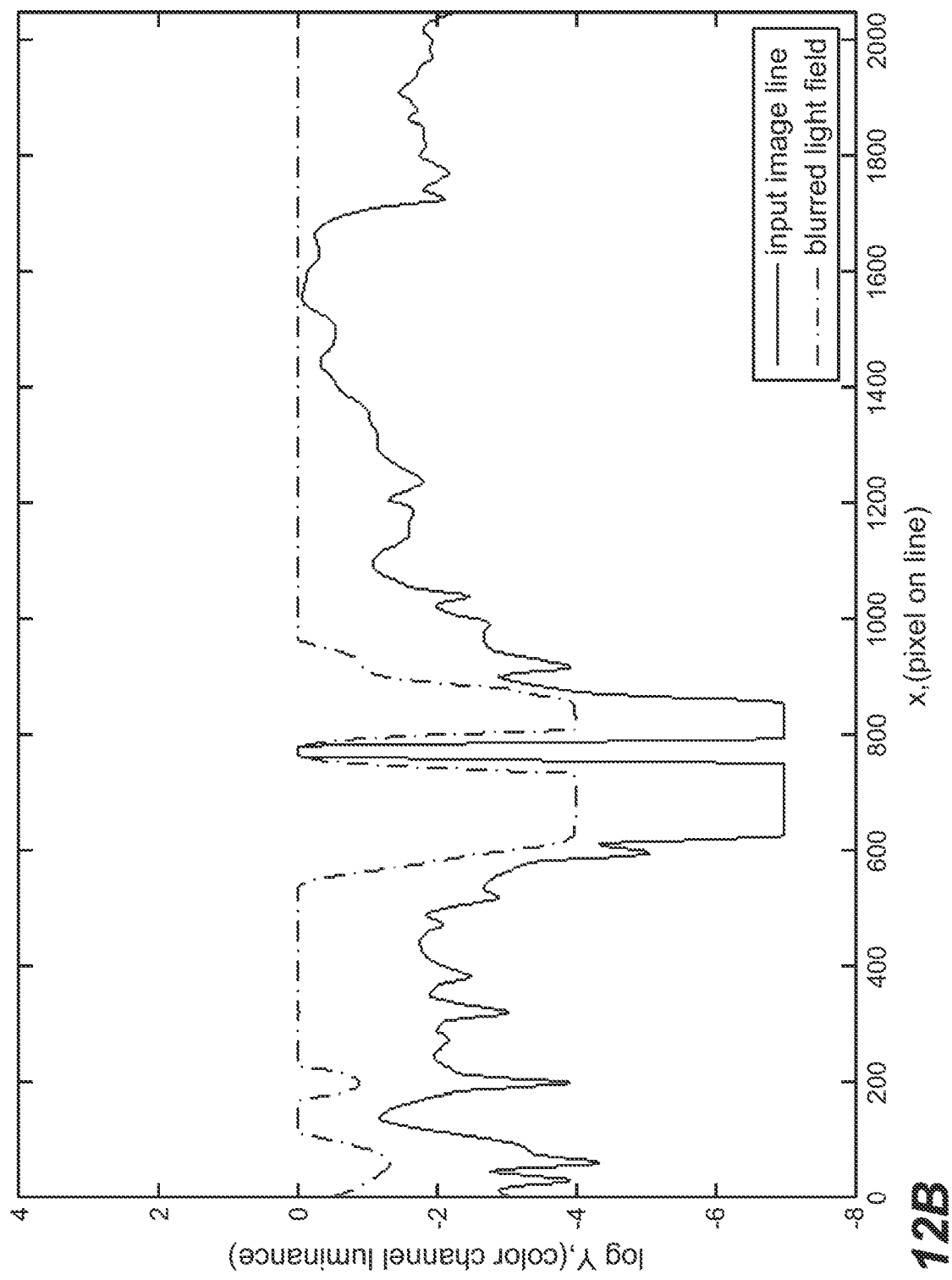

For another exemplary set of figures, FIGS. 12A and 12B show merely one non-limiting example of some of the processes described herein. In this case, a 1-D horizontal line of an example image is used rather than image surfaces to more clearly show the quantities described. Luminance is normalized to 1, the maximum blurred light field level. FIG. 12A shows the input image line and its bandlimited upper bound and lower bound. The lower bound is also shown scaled by the contrast ratio of the primary DMD (primaryCR=1000 here); this is the highest level the light field can be such that the primary DMD can still achieve the lower bound. FIG. 12B shows the light field to be the maximum of the upper bound and scaled lower bound; this value is limited to 1 because that is the maximum light field level.

This light field is at maximum level as much as possible given the rules used for this example.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A method for calibrating a projector display system, said projector display system comprising a light source, a controller, said controller receiving input image data and outputting control signals, a premod modulator receiving control signals from said controller and light from said light source, a blurring optical system receiving light from said premod modulator, and a primary modulator receiving control signals from said controller and light from said blurring optical system, the method comprising:
   displaying the first calibration image by controlling the premod modulator to display a first dot array and by controlling the primary modulator to be fully on, such that each pixel of the primary modulator conveys light received from the premod modulator through the blurring optical system along on optical path that includes a projection screen;
   capturing said first calibration image with an image capture device;
   displaying a second calibration image by controlling the premod modulator such that each pixel of the premod modulator is at its maximum brightness level and by controlling the primary modulator to display a second dot array;
   capturing said second calibration image with the image capture device;
   using the captures of the first calibration image and the second calibration image, determining mapping between the premod modulator and the primary modulator.

2. The method of claim 1, wherein determining the mapping between the premod modulator and the primary modulator comprises:
   using at least the capture of the first calibration image, determining mapping between the premod modulator and the image capture device;
   using at least the capture of the second calibration image, determining mapping between the primary modulator and the image capture device; and
   using the determined mapping between the premod modulator and the image capture device and the determined mapping between the primary modulator and the image capture device; determining mapping between the premod modulator and the primary modulator.

3. The method of claim 1, wherein the premod modulator comprises one of a group, said group comprising: a DMD, a MEMS, a digital reflector, and an analog reflector.

4. The method of claim 1, wherein the premod modulator comprises a DMD array that processes a plurality of color channels.

5. The method of claim 1, wherein the primary modulator comprises one of a group, said group comprising: a DMD, a MEMS, a digital reflector, and an analog reflector.

6. The method of claim 1, wherein the primary modulator comprises a DMD array that processes a plurality of color channels.

7. A method for calibrating a projector display system, said projector display system comprising a light source, a controller, said controller receiving input image data and outputting control signals, a premod modulator receiving control signals from said controller and light from said light source, a blurring optical system receiving light from said premod modulator, and a primary modulator receiving control signals from said controller and light from said blurring optical system, the method comprising:
   conditioning, prior to displaying a calibration image, the projector display system by controlling the premod modulator such that each pixel of the premod modulator is at its maximum brightness level;
   displaying the calibration image by controlling the premod modulator to display a dot array and by controlling the primary modulator to be fully on, such that each pixel of the primary modulator conveys light received from the premod modulator through the blurring optical system along on optical path that includes a projection screen;
   capturing said calibration image with an image capture device; and
   using the capture of the calibration image, determining mapping between the premod modulator and the primary modulator.

8. The method of claim 7, wherein displaying the calibration image comprises displaying the calibration image only long enough to facilitate the capturing of said calibration image with the image capture device.

9. The method of claim 7 further comprising:
   further conditioning, after displaying the calibration image, the projector display system by controlling the premod modulator such that each pixel of the premod modulator is at its maximum brightness level.

10. The method of claim 7, wherein the premod modulator comprises one of a group, said group comprising: a DMD, a MEMS, a digital reflector, and an analog reflector.

11. The method of claim 7, wherein the premod modulator comprises a DMD array that processes a plurality of color channels.

12. The method of claim 7, wherein the primary modulator comprises one of a group, said group comprising: a DMD, a MEMS, a digital reflector, and an analog reflector.

13. The method of claim 7, wherein the primary modulator comprises a DMD array that processes a plurality of color channels.

* * * * *

UNITED STATES PATENT AND TRADEMARK OFFICE
CERTIFICATE OF CORRECTION

PATENT NO. : 11,838,692 B2
APPLICATION NO. : 18/168289
DATED : December 5, 2023
INVENTOR(S) : Shields et al.

It is certified that error appears in the above-identified patent and that said Letters Patent is hereby corrected as shown below:

In the Claims

Column 22, Line 1, In Claim 2, delete "device;" and insert -- device, -- therefor Signed and Sealed this
Twentieth Day of August, 2024

Katherine Kelly Vidal
*Director of the United States Patent and Trademark Office*